United States Patent
Fukuda

(10) Patent No.: US 11,388,383 B2
(45) Date of Patent: Jul. 12, 2022

(54) IMAGE PROCESSING APPARATUS, IMAGE PICKUP APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Koichi Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/937,622

(22) Filed: Jul. 24, 2020

(65) Prior Publication Data

US 2020/0358998 A1 Nov. 12, 2020

Related U.S. Application Data

(60) Division of application No. 15/724,471, filed on Oct. 4, 2017, now Pat. No. 10,771,762, which is a (Continued)

(30) Foreign Application Priority Data

May 8, 2015 (JP) .................................. 2015-095348
Apr. 13, 2016 (JP) .............................. JP2016-080328

(51) Int. Cl.
*H04N 13/128* (2018.01)
*G03B 13/36* (2021.01)
(Continued)

(52) U.S. Cl.
CPC ........... *H04N 13/128* (2018.05); *G03B 13/36* (2013.01); *G03B 35/10* (2013.01); *G06T 5/005* (2013.01);
(Continued)

(58) Field of Classification Search
None
See application file for complete search history.

(56) References Cited

U.S. PATENT DOCUMENTS 4,410,804 A   10/1983   Stauffer
7,301,571 B2  11/2007   Kobayashi et al.
(Continued)

FOREIGN PATENT DOCUMENTS

CN   102710903 A   10/2012
CN   104243778 A   12/2014
(Continued)

OTHER PUBLICATIONS

Jul. 26, 2016 International Search Report and Written Opinion in International Patent Appln. No. PCT/JP2016/002144.
(Continued)

*Primary Examiner* — James M Anderson, II
(74) *Attorney, Agent, or Firm* — Venable LLP

(57) ABSTRACT

An image processing apparatus includes an acquisition unit which acquires a parallax image generated based on a signal of a photoelectric converter among a plurality of photoelectric converters which receive light beams passing through partial pupil regions of an imaging optical system different from each other, and acquires a captured image generated by combining signals of the plurality of photoelectric converters, and an image processing unit which performs correction process so as to reduce a defect included in the parallax image based on the captured image.

24 Claims, 18 Drawing Sheets

Related U.S. Application Data continuation of application No. PCT/JP2016/002144, filed on Apr. 21, 2016.

(51) Int. Cl.

| | |
|---|---|
| *H04N 5/357* | (2011.01) |
| *H04N 13/106* | (2018.01) |
| *H04N 13/232* | (2018.01) |
| *H04N 9/04* | (2006.01) |
| *G03B 35/10* | (2021.01) |
| *H04N 5/369* | (2011.01) |
| *G06T 5/00* | (2006.01) |
| *G06T 7/50* | (2017.01) |
| *H04N 13/225* | (2018.01) |
| *H04N 13/257* | (2018.01) |
| *H04N 5/232* | (2006.01) |
| *H04N 5/243* | (2006.01) |

(52) U.S. Cl.
CPC .............. *G06T 7/50* (2017.01); *H04N 5/3572* (2013.01); *H04N 5/36961* (2018.08); *H04N 9/04557* (2018.08); *H04N 13/106* (2018.05); *H04N 13/225* (2018.05); *H04N 13/232* (2018.05); *G06T 2207/10024* (2013.01); *G06T 2207/10052* (2013.01); *H04N 5/23212* (2013.01); *H04N 5/243* (2013.01); *H04N 13/257* (2018.05)

(56) References Cited

U.S. PATENT DOCUMENTS

| | | | |
|---|---|---|---|
| 7,872,680 B2 | 1/2011 | Misawa | |
| 8,503,819 B2 | 8/2013 | Chen | |
| 8,593,547 B2 | 11/2013 | Ueda | |
| 8,773,549 B2 | 7/2014 | Fukuda | |
| 9,426,349 B2 | 8/2016 | Fukuda | |
| 9,549,157 B2 | 1/2017 | Shinozaki | |
| 9,736,410 B2 | 8/2017 | Uchida | |
| 10,545,311 B2 | 1/2020 | Fukuda | |
| 2004/0145664 A1 | 7/2004 | Kobayashi et al. | |
| 2008/0180554 A1 | 7/2008 | Kobayashi et al. | |
| 2008/0259188 A1 | 10/2008 | Kobayashi et al. | |
| 2009/0129663 A1* | 5/2009 | Chen | G06T 5/40 382/149 |
| 2012/0113301 A1* | 5/2012 | Ueda | H04N 5/367 348/246 |
| 2014/0368696 A1 | 12/2014 | Uchida | |
| 2015/0249795 A1 | 9/2015 | Cho et al. | |
| 2017/0070694 A1 | 3/2017 | Shinozaki | |
| 2017/0154408 A1 | 6/2017 | Jobara et al. | |
| 2018/0003923 A1 | 1/2018 | Fukuda | |
| 2018/0013951 A1 | 1/2018 | Fukuda | |

FOREIGN PATENT DOCUMENTS

| | | |
|---|---|---|
| JP | H07-135600 A | 5/1995 |
| JP | 2001-083407 A | 3/2001 |
| JP | 2004-222177 A | 8/2004 |
| JP | 2007-124056 A | 5/2007 |
| JP | 2012-105023 A | 5/2012 |
| JP | 2014-033415 A | 2/2014 |
| JP | 2014-086863 A | 5/2014 |
| JP | 2015-002400 A | 1/2015 |
| JP | 2015-002531 A | 1/2015 |
| TW | 200924507 A | 6/2009 |
| WO | 2016/139895 A1 | 9/2016 |
| WO | 2016/143913 A1 | 9/2016 |

OTHER PUBLICATIONS

Nov. 14, 2017 International Preliminary Reporton Patentability in International Patent Appln. No. PCT/2016/002144.
Nov. 21, 2018 Extended European Search Report in European Patent Appln. No. 16792350.7.
Sep. 27, 2019 Chinese Official Action in Chinese Patent Appln. No. 201680026847.4.
Apr. 28, 2020 Japanese Official Action in Japanese Patent Appln. No. 2016-080328.

* cited by examiner

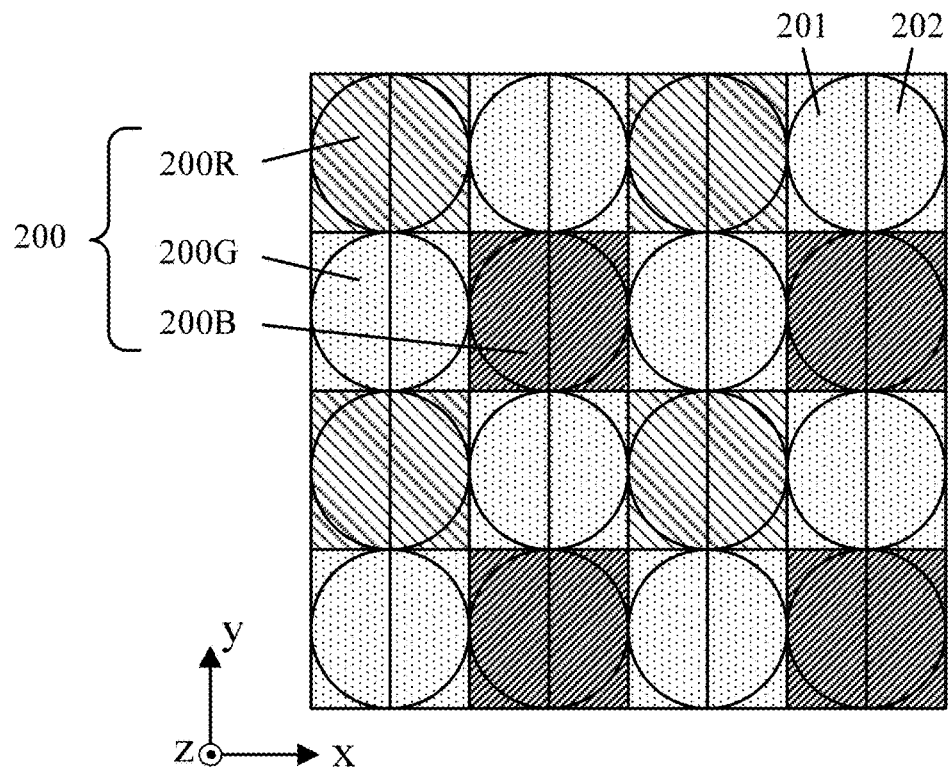
FIG. 2
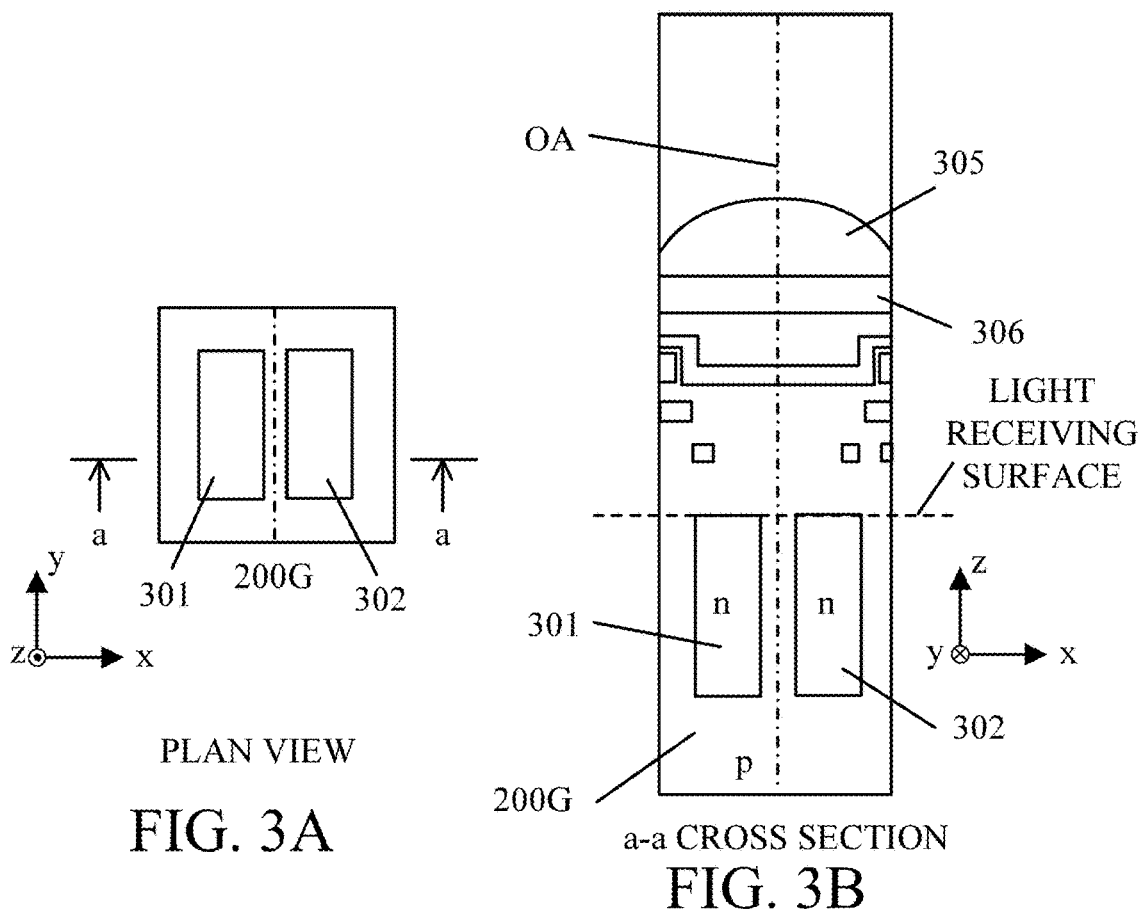
PLAN VIEW
FIG. 3A
a-a CROSS SECTION
FIG. 3B

PLAN VIEW a-a CROSS SECTION

FOCUS POSITION

SECTIONAL VIEW HORIZONTAL TO OPTICAL AXIS

SECTIONAL VIEW VERTICAL TO OPTICAL AXIS

IMAGE PROCESSING APPARATUS, IMAGE PICKUP APPARATUS, IMAGE PROCESSING METHOD, AND NON-TRANSITORY COMPUTER-READABLE STORAGE MEDIUM

This application is a division of U.S. patent application Ser. No. 15/724,471 filed Oct. 4, 2017, which is a continuation of International Patent Application No. PCT/JP2016/002144 filed Apr. 21, 2016, which claims the benefit of Japanese Patent Application No. 2015-095348 filed May 8, 2015 and Japanese Patent Application No. 2016-080328 filed Apr. 13, 2016, which are hereby incorporated by reference herein in their entirety.

BACKGROUND OF THE INVENTION

Field of the Invention

The present invention relates to an image processing apparatus which is capable of correcting a parallax image.

Background Art

An image pickup apparatus has conventionally been known which is capable of dividing an exit pupil in an imaging lens into a plurality of pupil regions and simultaneously capturing a plurality of parallax images corresponding to the divided pupil regions. The captured parallax image (viewpoint image) is equivalent to LF (light field) data as information on a spatial distribution and an angular distribution of a light amount.

PTL1 discloses an image pickup apparatus which uses a two-dimensional image pickup element that includes a single micro lens and a plurality of divided photoelectric converters for one pixel. The divided photoelectric converters receive light beams passing through different partial pupil regions in an exit pupil in an imaging lens via the single micro lens, and thus the pupil is divided. A plurality of parallax images corresponding to the divided partial pupil regions can be generated based on light receiving signals of the respective divided photoelectric converters. PTL2 discloses an image pickup apparatus that adds all of light receiving signals of divided photoelectric converters to one another and generates a captured image.

However, a defect (flaw signal) such as a dot flaw and a line flaw, shading caused by the pupil division, a saturated signal etc. may occur in a part of the parallax image (viewpoint image) obtained by the image pickup apparatuses disclosed in PTL1 and PTL2 and the parallax image may be degraded.

CITATION LIST

Patent Literature

PTL1 U.S. Pat. No. 4,410,804
PTL2 Japanese Patent Laid-Open No. 2001-083407

SUMMARY OF THE INVENTION

The present invention provides an image processing apparatus, an image pickup apparatus, an image pickup method, and a non-transitory computer-readable storage medium, each of which can generate a parallax image having an improved quality.

An image processing apparatus as one aspect of the present invention includes an acquisition unit configured to acquire a parallax image generated based on a signal from one of a plurality of photoelectric converters which receive light beams passing through partial pupil regions of an imaging optical system different from each other, and to acquire a captured image generated by combining a plurality of signals from the plurality of photoelectric converters, and an image processing unit configured to correct the parallax image based on the captured image.

An image pickup apparatus as another aspect of the present invention includes an image pickup element including a plurality of arrayed pixels that include a plurality of photoelectric converters that receive light beams passing through partial pupil regions in an imaging optical system different from each other, an acquisition unit configured to acquire a parallax image generated based on a signal from one of the plurality of photoelectric converters, and to acquire a captured image generated by combining signals from the plurality of photoelectric converters, and an image processing unit configured to correct the parallax image based on the captured image.

An image processing method as another aspect of the present invention includes the steps of acquiring a parallax image generated based on a signal from one of a plurality of photoelectric converters which receive light beams passing through partial pupil regions of an imaging optical system different from each other, and acquiring a captured image generated by combining a plurality of signals from the plurality of photoelectric converters, and correcting the parallax image based on the captured image.

A non-transitory computer-readable storage medium as another aspect of the present invention stores a program which causes a computer to execute the steps of acquiring a parallax image generated based on a signal from one of a plurality of photoelectric converters which receive light beams passing through partial pupil regions of an imaging optical system different from each other, and acquiring a captured image generated by combining a plurality of signals from the plurality of photoelectric converters, and correcting the parallax image based on the captured image.

Further features and aspects of the present invention will become apparent from the following description of exemplary embodiments with reference to the attached drawings.

The present invention can provide an image processing apparatus, an image pickup apparatus, an image pickup method, and a non-transitory computer-readable storage medium which are capable of generating a parallax image having an improved image quality.

BRIEF DESCRIPTION OF THE DRAWINGS

FIG. 2 is a diagram of illustrating a pixel array according to a first embodiment.
FIG. 3A is a diagram of illustrating a pixel structure according to the first embodiment.
FIG. 3B is a diagram of illustrating a pixel structure according to the first embodiment.

DESCRIPTION OF THE EMBODIMENTS

Exemplary embodiments of the present invention will be described below with reference to the accompanied drawings.

First Embodiment

Figure 1:
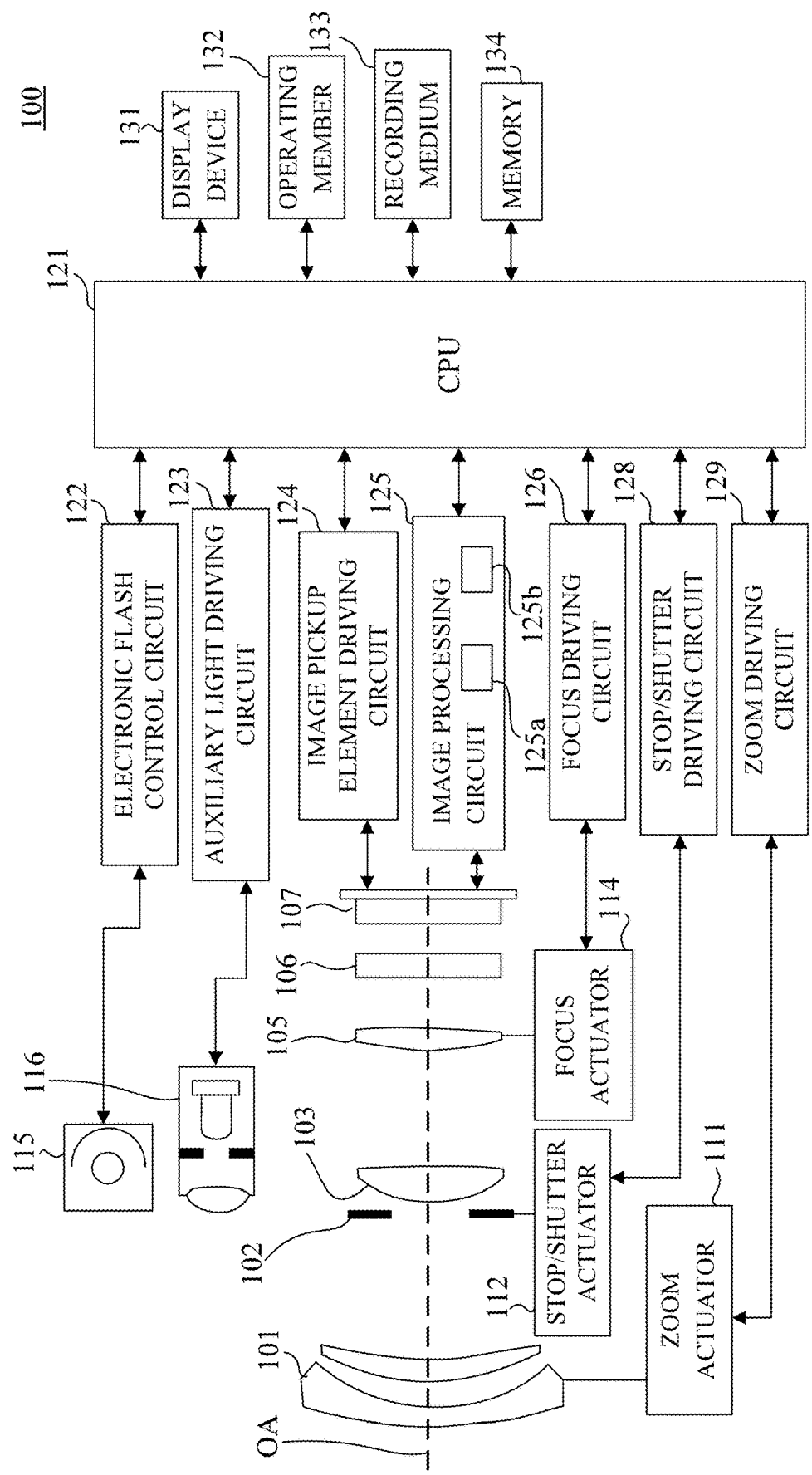
FIG. 1 is a block diagram of an image pickup apparatus in each embodiment.

Referring now to FIG. 1, a schematic configuration of an image pickup apparatus according to the first embodiment of the present invention will be described. FIG. 1 is a block diagram of an image pickup apparatus 100 (camera) in this embodiment. The image pickup apparatus 100 is a digital camera system that includes a camera body and an interchangeable lens (imaging optical system or image pickup optical system) removably attached to the camera body. However, this embodiment is not limited to this example, and is applicable to an image pickup apparatus that includes a camera body and a lens which are integrated with each other.

A first lens unit 101 is disposed at the forefront side (object side) among a plurality of lens units that constitute an imaging lens (imaging optical system), and is held on a lens barrel so as to move back and forth in a direction of an optical axis OA (optical axis direction). A stop/shutter 102 (aperture stop) adjusts its opening diameter to control a light amount in capturing an image, and also functions as a shutter to control an exposure time in capturing a still image. A second lens unit 103 moves integrally with the stop/shutter 102 back and forth in the optical axis direction, and has a zoom function for a magnification-varying operation in conjunction with the back-and-forth motion of the first lens unit 101. A third lens unit 105 is a focus lens unit that moves back and forth in the optical axis direction for focusing (a focus operation). An optical lowpass filter 106 is an optical element that reduces a false color or a moire of a captured image (captured image).

An image pickup element 107 (image sensor) performs a photoelectric conversion of an object image (optical image) formed by the imaging optical system, and for example, includes a CMOS sensor or a CCD sensor, and its peripheral circuit. As the image pickup element 107, for example, a two-dimensional single plate color sensor is used which includes a primary color mosaic filter having a Bayer array formed on light receiving pixels having m pixels in a horizontal direction and having n pixels in a vertical direction in an on-chip configuration.

A zoom actuator 111 rotationally moves (drives) an unillustrated cam cylinder to move the first lens unit 101 and the second lens unit 103 along the optical axis direction for the magnification-varying operation. The stop/shutter actuator 112 controls the opening diameter of the stop/shutter 102 to adjust the light amount (imaging light amount) and also controls the exposure time in capturing the still image. A focus actuator 114 moves the third lens unit 105 in the optical axis direction for focusing.

An electronic flash 115 is an illumination device to be used for illuminating the object. The electronic flash 115 can use a flash illumination device that includes a xenon tube or an illumination device that includes an LED (light emitting diode) continuously emitting light. An AF auxiliary lighting unit 116 projects an image of a mask having a predetermined opening pattern onto the object via a projection lens. This configuration can improve a focus detection capability for a dark object or an object with a low contrast.

A CPU 121 is a control apparatus (control unit or controller) that governs various controls over the image pickup apparatus 100. The CPU 121 includes a processor, a ROM, a RAM, an A/D converter, a D/A converter, a communication interface circuit, and the like. The CPU 121 reads out and executes a predetermined program stored in the ROM to drive various circuits of the image pickup apparatus 100 and to perform a series of operations such as focus detection (AF), imaging (photographing), image processing, or recording.

An electronic flash control circuit 122 controls lighting on and off of the electronic flash 115 in synchronization with the imaging operation. An auxiliary light driving circuit 123 controls lighting on and off of the AF auxiliary lighting unit 116 in synchronization with the focus detection operation. An image pickup element driving circuit 124 controls the imaging operation of the image pickup element 107 and also performs the A/D conversion of the acquired image signal to send it to the CPU 121.

An image processing circuit 125 (image processing apparatus) provides processes such as a γ (gamma) conversion, a color interpolation, or a JPEG (Joint Photographic Experts Group) compression on the image data output from the image pickup element 107. In this embodiment, the image processing circuit 125 includes an acquisition unit 125a and an image processing unit 125b (corrector). The acquisition unit 125a acquires a captured image and at least one parallax image (viewpoint image) from the image pickup element 107. The captured image is an image generated by combining a plurality of signals (first signal and second signal) from a plurality of photoelectric converters (first subpixel and second subpixel) which receive light beams passing through different partial pupil regions of the imaging optical system. The parallax image (viewpoint image) is an image generated based on a signal from a photoelectric converter (first subpixel or second subpixel) among the plurality of photoelectric converters. The image processing unit 125b performs a correction process (corrects a defect) so as to reduce a defect included in the parallax image based on the captured image.

A focus driving circuit 126 (focus driver) drives the focus actuator 114 based on the focus detection result to move the third lens unit 105 along the optical axis direction for focusing. A stop/shutter driving circuit 128 drives the stop/shutter actuator 112 to control the opening diameter of the stop/shutter 102. A zoom driving circuit 129 (zoom driver) drives the zoom actuator 111 in response to a zoom operation by a user.

A display device 131 (display unit) includes for example, an LCD (liquid crystal display). The display device 131 displays information on an imaging mode of the image pickup apparatus 100, a pre-captured preview image, a captured image for confirmation use, an in-focus state displaying image in the focus detection, or the like. An operating member 132 (operating switch unit) includes a power switch, a release (imaging trigger) switch, a zooming switch, an imaging mode selection switch, and the like. The release switch is a two-step switch in a half-pressed state (in a state where SW1 is ON) and in a fully pressed state (in a state where SW2 is ON). A recording medium 133 is, for example, a flash memory that is removable from the image pickup apparatus 100, and records a captured image (image data).

Referring now to FIGS. 2, 3A, and 3B, a pixel array and a pixel structure of the image pickup element 107 according to this embodiment will be described. FIG. 2 is a diagram illustrating the pixel array of the image pickup element 107. FIGS. 3A and 3B are diagrams illustrating the pixel structure of the image pickup element 107, and FIG. 3A illustrates a plan view of a pixel 200G of the image pickup element 107 (view in a +z direction) and FIG. 3B illustrates an a-a sectional view in FIG. 3A (viewed in a −z direction).

FIG. 2 illustrates the pixel array (array of imaging pixels) on the image pickup element 107 (two-dimensional CMOS sensor) in a range of 4 columns×4 rows. In this embodiment, each of the imaging pixels (pixels 200R, 200G, and 200B) includes two subpixels 201 and 202. Therefore, FIG. 2 illustrates the array of the subpixels in a range of 8 columns×4 rows.

As illustrated in FIG. 2, a pixel group 200 of 2 columns×2 rows includes the pixels 200R, 200G, and 200B in a Bayer array. In the pixel group 200, the pixel 200R having a spectral sensitivity for R (red) is disposed at the upper left, the pixels 200G having a spectral sensitivity for G (green) are disposed at the upper right and at the lower left, and the pixel 200B having a spectral sensitivity for B (blue) is disposed at the lower right. Each of the pixels 200R, 200G, and 200B (each imaging pixel) includes the subpixels 201 and 202 arrayed in 2 columns×1 row. The subpixel 201 is a pixel which receives a light beam passing through a first pupil region in the imaging optical system. The subpixel 202 is a pixel which receives a light beam passing through a second pupil region in the imaging optical system.

As illustrated in FIG. 2, the image pickup element 107 includes many imaging pixels of 4 columns×4 rows (subpixels of 8 columns×4 rows) arranged on its surface, and outputs an imaging signal (subpixel signal). In the image pickup element 107 of this embodiment, a period P of the pixels (imaging pixels) is 4 μm, and the number N of pixels (imaging pixels) is horizontally 5,575 columns×vertically 3725 rows=approximately 20.75 million pixels. In the image pickup element 107, a period $P_{SUB}$ of the subpixels in a column direction is 2 μm, and the number $N_{SUB}$ of the subpixels is horizontally 11,150 columns×vertically 3,725 rows=approximately 41.50 million pixels. Alternatively, the image pickup element 107 may have a period P of the pixels of 6 μm and the number N of pixels (imaging pixels) of horizontally 6,000 columns×vertically 4,000 rows=approximately 24.00 million pixels. Alternatively, in the image pickup element 107, a period $P_{SUB}$ of the subpixels in a column direction may be 3 μm, and the number $N_{SUB}$ of the subpixels may be horizontally 12,000 columns× vertically 4,000 rows=approximately 48.00 million pixels.

As illustrated in FIG. 3B, the pixel 200G of this embodiment is provided with a micro lens 305 at a light receiving surface side of the pixel to condense the incident light. The plurality of micro lenses 305 are two-dimensionally arrayed, and each of the micro lenses 305 is disposed at a position away from the light receiving surface by a predetermined distance in a z-axis direction (direction of an optical axis direction OA). In the pixel 200G, a photoelectric converter 301 and a photoelectric converter 302 (photoelectric converters) are formed by dividing the pixel into $N_H$ (two divisions) in an x direction and into $N_V$ (one division) in a y direction. The photoelectric converter 301 and the photoelectric converter 302 correspond to the subpixel 201 and the subpixel 202, respectively.

Each of the photoelectric converters 301 and 302 is configured as a photodiode having a p-i-n structure that includes a p-type layer and an n-type layer and an intrinsic layer between the p-type layer and the n-type layer. If necessary, the intrinsic layer can be excluded and a photodiode with a p-n junction may be applicable. The pixel 200G (each pixel) is provided with a color filter 306 between the micro lens 305 and each of the photoelectric converters 301 and 302. If necessary, a spectral transmittance of the color filter 306 can be changed for each subpixel, or alternatively the color filter may be excluded.

As illustrated in FIGS. 3A and 3B, the light entering the pixel 200G is condensed by the micro lens 305 and is dispersed by the color filter 306, and then the dispersed lights are received by the photoelectric converters 301 and 302. In each of the photoelectric converters 301 and 302, pairs of an electron and a hole are generated depending on a light receiving amount and they are separated in a depletion layer, and then the electrons with a negative charge are accumulated in the n-type layer. On the other hand, the holes are excluded to the outside of the image pickup element 107 through the p-type layer connected to a constant voltage source (not illustrated). The electrons accumulated in the n-type layers of the photoelectric converters 301 and 302 are transferred to an electrostatic capacitance (FD) through a transfer gate to be converted to a voltage signal.

Figure 4:
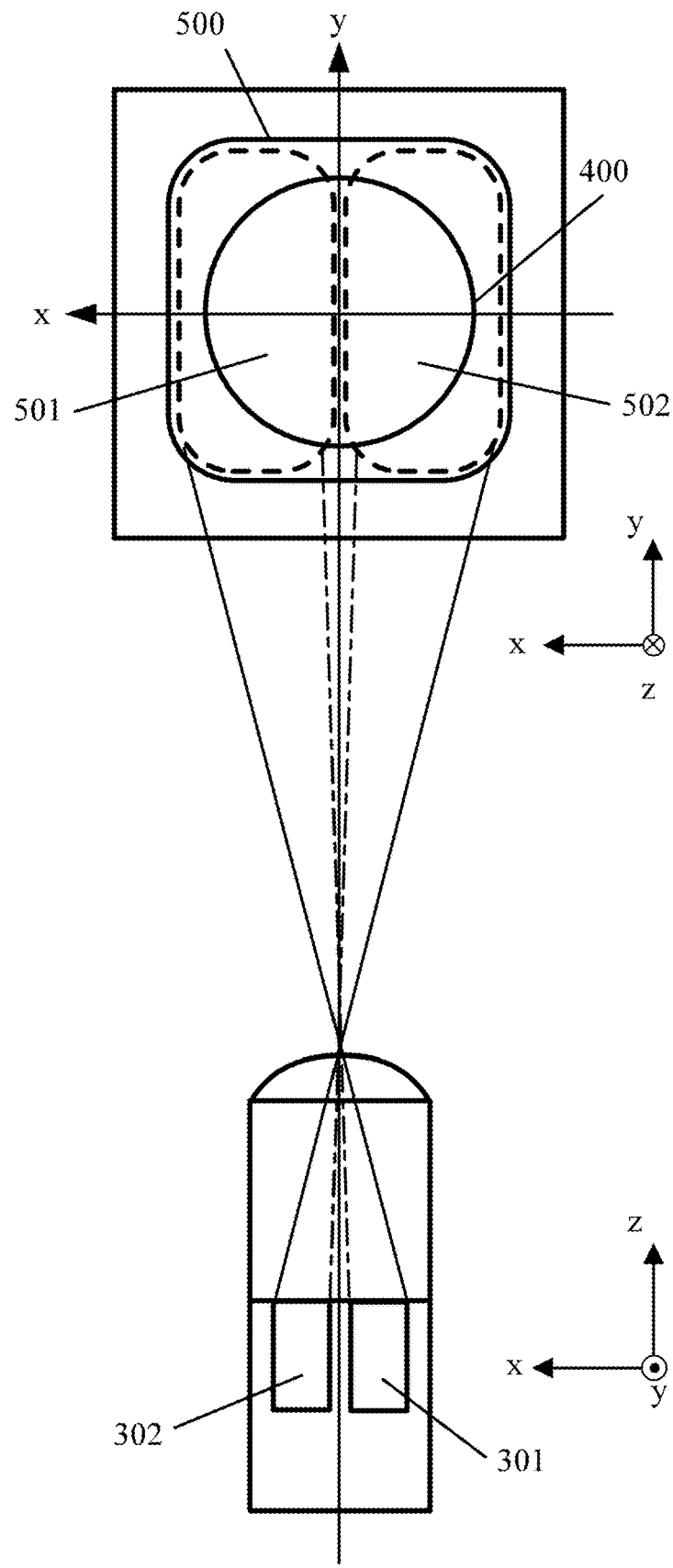
FIG. 4 is an explanatory diagram of an image pickup element and a pupil dividing function in each embodiment.

Referring now to FIG. 4, a pupil dividing function of the image pickup element 107 will be described. FIG. 4 is an explanatory diagram of the pupil dividing function of the image pickup element 107, and illustrates the pupil division in one pixel portion. FIG. 4 illustrates an a-a sectional view of the pixel structure illustrated in FIG. 3A viewed from the +y direction and an exit pupil plane of the imaging optical system. In FIG. 4, in order to correspond to a coordinate axis of the exit pupil plane, the x-axis and y-axis in the sectional view are inverted with respect to the x-axis and y-axis of FIGS. 3A and 3B.

In FIG. 4, a partial pupil region 501 (first partial pupil region) for the subpixel 201 (first subpixel) has an approximately conjugate relationship, via the micro lens 305, with the light receiving surface of the photoelectric converter 301 whose center of gravity is displaced (decentered) in the −x direction. Thus, the partial pupil region 501 represents a pupil region which is capable of receiving light by the subpixel 201. The center of gravity of the partial pupil region 501 for the subpixel 201 is displaced (decentered) in the +x direction on a pupil plane. A partial pupil region 502 (second partial pupil region) for the subpixel 202 (second subpixel) has an approximately conjugate relationship, via the micro lens 305, with the light receiving surface of the photoelectric converter 302 whose center of gravity is displaced (decentered) in the +x direction. Thus, the partial pupil region 502 represents a pupil region which is capable of receiving light by the subpixel 202. The center of gravity of the partial pupil region 502 for the subpixel 202 is displaced (decentered) in the −x direction on the pupil plane. A pupil region 500 can receive light over the entire region of the pixel 200G when the photoelectric converters 301 and 302 (subpixels 201 and 202) are entirely combined.

The incident light is condensed on a focus position by the micro lens 305. However, due to an influence of diffraction caused by wave nature of light, a diameter of a light condensed spot cannot be made smaller than a diffraction limit Δ and it has a finite size. While the light receiving surface of each of the photoelectric converters 301 and 302 has a length of around 1 to 2 μm, the condensed spot of the micro lens 305 is around 1 μm. Accordingly, the partial pupil regions 501 and 502 in FIG. 4 which have a conjugate relationship with the light receiving surface of the photoelectric converters 301 and 302 via the micro lens 305 are not clearly divided due to a diffraction blur, and thus a light receiving rate distribution (pupil intensity distribution) is obtained.

Figure 5:
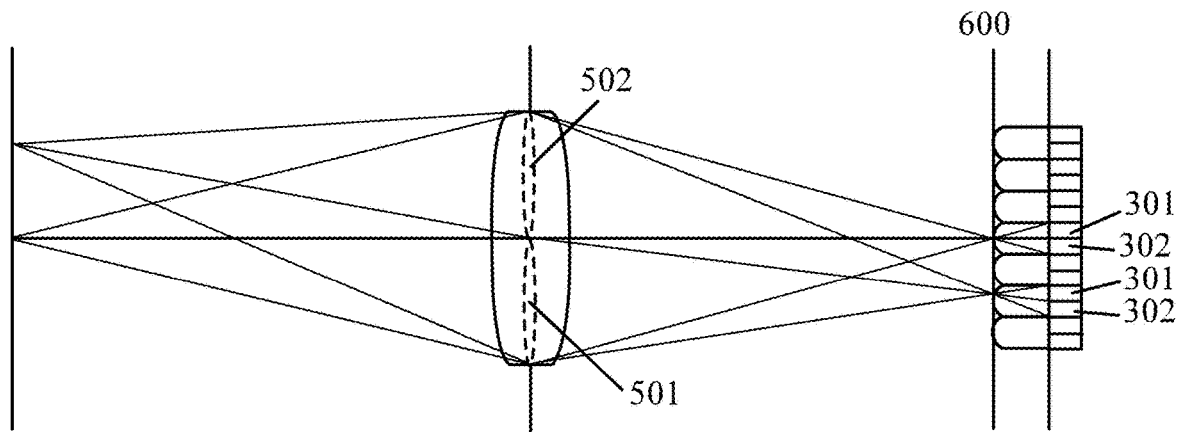
FIG. 5 is an explanatory diagram of the image pickup element and the pupil dividing function in each embodiment.

FIG. 5 is an explanatory view of the image pickup element 107 and the pupil dividing function. The light beams passing through the different partial pupil regions 501 and 502 in the pupil region in the imaging optical system enter each pixel of the image pickup element 107 on an imaging plane 600 of the image pickup element 107 at angles different from each other, and are received by the subpixels 201 and 202 divided into 2×1. This embodiment describes an illustrative pupil region bisected in a horizontal direction, but the present invention is not limited to this embodiment and the pupil may be divided in a vertical direction, if necessary.

In this embodiment, the image pickup element 107 includes the plurality of subpixels that share a single micro lens and that receive a plurality of light beams passing through different regions (first partial pupil region and second partial pupil region) in a pupil of the imaging optical system (imaging lens). The image pickup element 107 includes, as the plurality of subpixels, first subpixels (a plurality of subpixels 201) and second subpixels (a plurality of subpixels 202).

In this embodiment, signals of the subpixels 201 and 202 are added (combined) to each other and read out for each pixel of the image pickup element 107 so that a captured image is generated with a resolution of the number N of effective pixels. As described above, the captured image is generated by combining light receiving signals of the plurality of subpixels (subpixels 201 and 202 in this embodiment) for each pixel.

In this embodiment, the light receiving signals of the plurality of subpixels 201 are collected to generate a first parallax image. The first parallax image is subtracted from the captured image to generate a second parallax image. However, this embodiment is not limited to this example, and the light receiving signals of the plurality of subpixels 202 may be collected to generate the second parallax image. Thus, the parallax image is generated based on the light receiving signals of the plurality of subpixels for each of the partial pupil regions that are different from each other.

In this embodiment, each of the first parallax image, the second parallax image, and the captured image is an image in the Bayer array. If necessary, each of the first parallax image, the second parallax image, and the captured image may be demosaiced.

Figure 6:
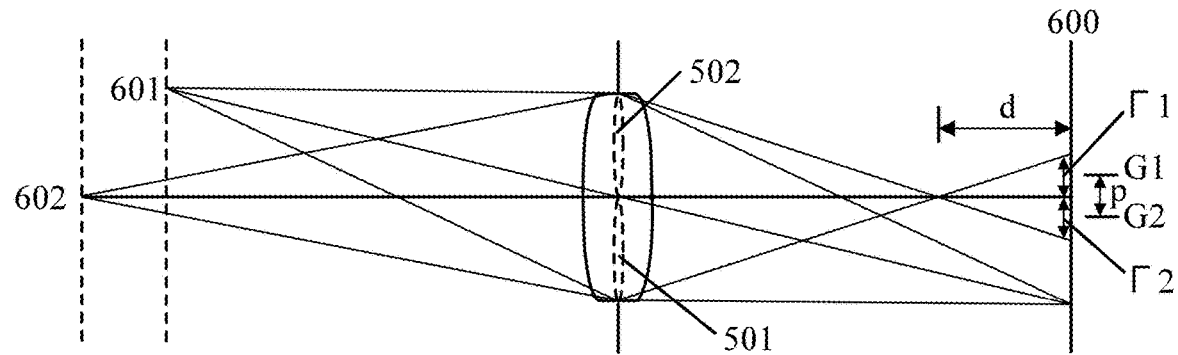
FIG. 6 is a diagram of a relationship between a defocus amount and an image shift amount in each embodiment.

Referring now to FIG. 6, a description will be given of a relationship between a defocus amount of the first parallax image acquired from the subpixels 201 and the second parallax image acquired from the subpixels 202 in the image pickup element 107, and an image shift amount. FIG. 6 illustrates the relationship between the defocus amount and the image shift amount. FIG. 6 illustrates the image pickup element 107 disposed on the imaging plane 600, and similarly to FIGS. 4 and 5, the exit pupil of the imaging optical system divided into two partial pupil regions 501 and 502.

A defocus amount d is defined such that a distance from an imaging position of an object to the imaging plane 600 is |d|, a front focus state has a negative sign (d<0) in which the imaging position is located closer to an object side than the imaging plane 600, and a rear focus state has a positive sign (d>0) in which the imaging position is located at a side opposite to the object relative to the imaging plane 600. In an in-focus state in which the imaging position of the object is on the imaging plane 600 (in-focus position), the defocus amount d=0 is satisfied. FIG. 6 illustrates an object 601 in the in-focus state (d=0) and an object 602 in the front focus state (d<0). The front focus state (d<0) and the rear focus state (d>0) will be collectively referred to as a defocus state (|d|>0).

In the front focus state (d<0), the light beam that has passed through the partial pupil region 501 (or partial pupil region 502) in the light beams from the object 602 is condensed once. Thereafter, the light beam spreads to a width Γ1 (Γ2) around a center position of gravity G1 (G2) of the light beam, and a blurred image is formed on the imaging plane 600. The blurred image is received by the subpixels 201 (subpixels 202) constituting each pixel arrayed in the image pickup element 107, and the first parallax image (second parallax image) is generated. Therefore, the first parallax image (second parallax image) is recorded as a blurred object image in which the object 602 is blurred with the width Γ1 (Γ2) at the center position of gravity G1 (G2) on the imaging plane 600. The blurred width Γ1 (Γ2) of the object image approximately increases in proportion as the absolute value |d| of the defocus amount d increases. Similarly, an absolute value |p| of an image shift amount p of the object image between the first and second parallax images (i.e. which is equivalent to a difference of the center positions of gravity of the light beams (G1−G2)) approximately increases as the absolute value |d| of the defocus amount d increases. This is similarly applied to the rear focus state (d>0), but an image shift direction of the object image between the first and second parallax images is opposite to that in the front focus state.

As described above, according to this embodiment, the absolute value of the image shift amount between the first and second parallax images increases as the absolute value of the defocus amount increases between the first and second parallax images or the imaging signals obtained by adding the first and second parallax images.

A description will now be given of the correction process of the parallax image in this embodiment. In this embodiment, the image pickup element 107 can output the captured image and at least one parallax image (at least one of the first parallax image and the second parallax image). The image processing circuit 125 (acquisition unit 125*a*) acquires the captured image and the parallax image that are output from the image pickup element 107. Then, the image processing circuit 125 (image processing unit 125*b*) corrects (revises) the parallax image based on the captured image. If necessary, the acquisition unit 125*a* may store the acquired captured image and at least one acquired parallax image in a memory such as the recording medium 133 and the memory 134 to acquire the captured image and parallax image which are stored in the memory.

Due to the influence caused by short-circuiting of the transfer gate according to a circuit configuration or a drive method of the image pickup element 107, a flaw signal (defect signal) may occur in the parallax image (first parallax image or second parallax image) and a defect such as a dot flaw and a line flaw may be included in the parallax image even if the captured image is normal. If necessary, defect information such as dot flaw information and line flaw information inspected in the mass production step or the like can be previously stored in the memory. In this case, the image processing circuit 125 (image processing unit 125*b*) performs the correction process of the parallax image by using the stored defect information. If necessary, the image processing circuit 125 (inspector) may inspect the parallax image on the real-time basis (i.e., while a user uses the image pickup apparatus 100) and determine a defect such as a dot flaw and a line flaw.

Figure 7A:
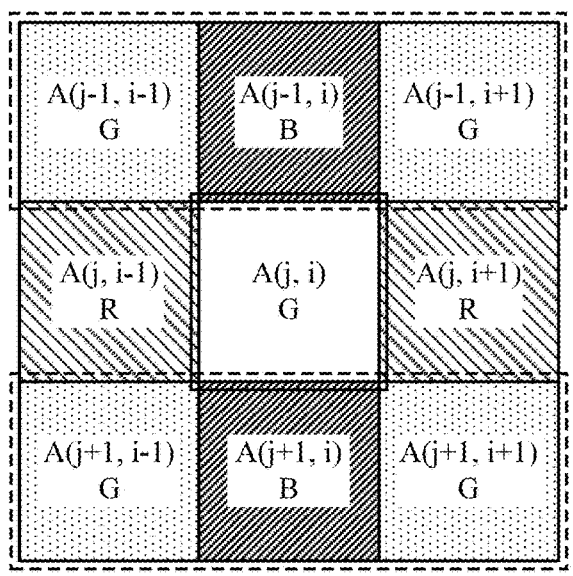
FIG. 7A is an arrangement diagram of a parallax image in each embodiment.
Figure 7B:
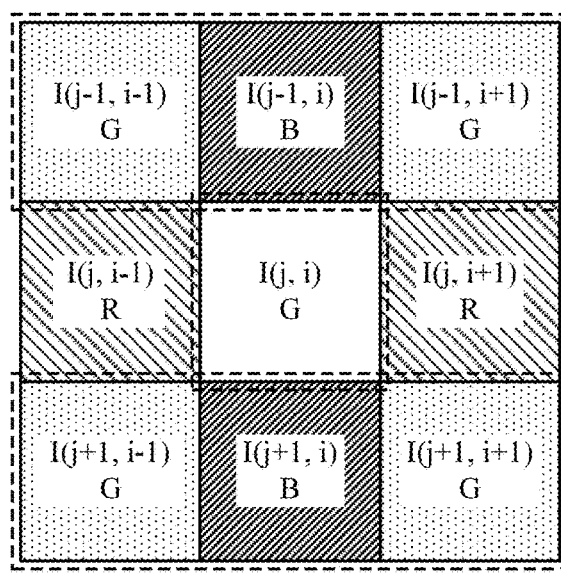
FIG. 7B is an arrangement diagram of the parallax image in each embodiment.

Referring now to FIGS. 7A and 7B, the correction process of the parallax image according to this embodiment will be described. FIG. 7A is an array diagram of the parallax image (first parallax image) in the Bayer array. FIG. 7B is an array diagram of the captured image in the Bayer array. In FIGS. 7A and 7B, pixel values (pixel signals) of the first parallax image and the captured image at a position (j, i) of an j-th pixel in a row direction and an i-th pixel in a column direction are defined as A(j, i) and I(j, i), respectively.

If the first parallax image includes the defect (line flaw) in the j-th row and the captured image is normal in the j-th row, it is necessary to correct the j-th row in the first parallax image. In this embodiment, the image processing circuit 125 (image processing unit 125*b*) corrects the first parallax image (pixel value at a position to be corrected in the first parallax image) based on the captured image. If necessary, the second parallax image can be corrected similarly.

In this embodiment, a correction value (correction signal) of the first parallax image at a position (j, i) where the defect occurs, i.e., position to be corrected (first position) is defined as Ac(j, i). The image processing unit 125*b* calculates the correction value Ac(j, i) according to the following expression (1), and corrects the first parallax image by using the calculated correction value Ac(j, i) as the pixel value A(j, i) of the first parallax image.

$$Ac(j, i) = \frac{\max\left(\sum_{k=i-1}^{i+1}[A(j-1, k) + A(j+1, k)], A0\right)}{\max\left(\sum_{k=i-1}^{i+1}[I(j-1, k) + I(j+1, k)], I0\right)} \times I(j, i) \quad (1)$$

In the expression (1), parameters A0 and I0 are values used to stabilize a calculation value and to suppress an amplification of a noise if the pixel value A of the first parallax image and the pixel value I of the captured image have low luminances (low luminance signals).

As described above, in this embodiment, the image processing unit 125*b* performs the correction process for the parallax image based on the captured image, i.e., replaces the pixel value A(j,i) of the parallax image at the position to be corrected with the correction value Ac(j,i). Specifically, the image processing unit 125*b* determines the correction value Ac(j, i) for the parallax image by using the pixel value I(j, i) of the captured image and pixel values I(j2, i2) and A(j2, i2) of the captured image and the parallax image at a position (j2, i2)≠(j, i) near the position to be corrected.

In the expression (1), specific values of the parameters A0 and I0 can be set as appropriate. For example, if the pupil dividing number Np is 2, the parameters A0 and I0 can be set to be A0=I0/Np. Values of the parameters A0 and I0 may be changed depending on an imaging condition such as a position (j, i) to be corrected, an ISO speed, an F-number of the imaging optical system, and an exit pupil distance. The values of the parameters A0 and I0 may be set based on a pixel value A of the first parallax image or a pixel value I of the captured image near (at the periphery of) the position to be corrected.

Figure 8:
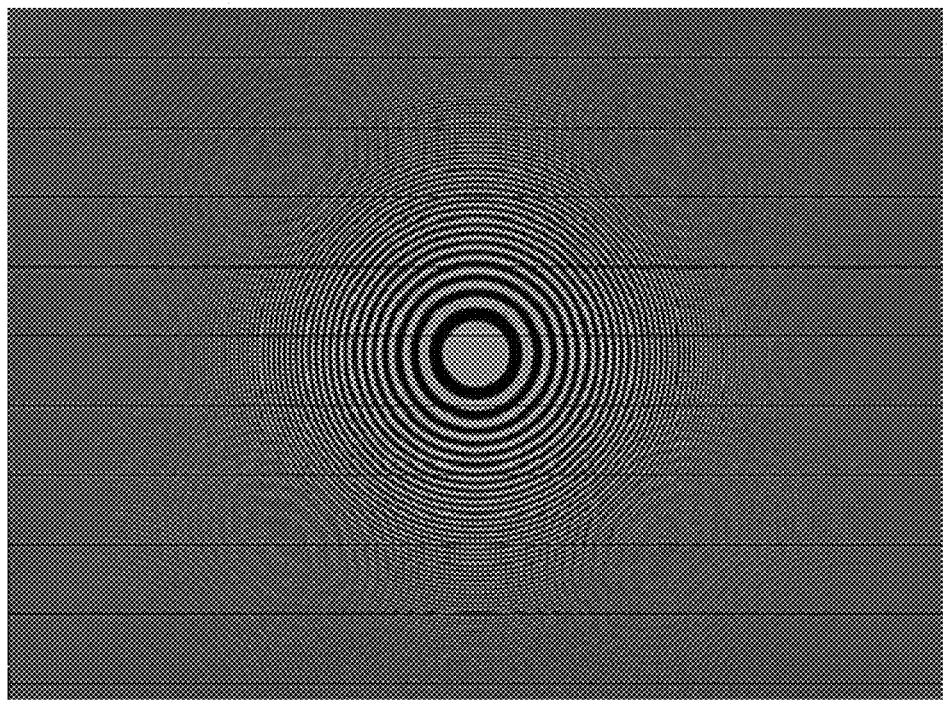
FIG. 8 is an exemplary parallax image before a correction process is performed in the first embodiment.
Figure 9:
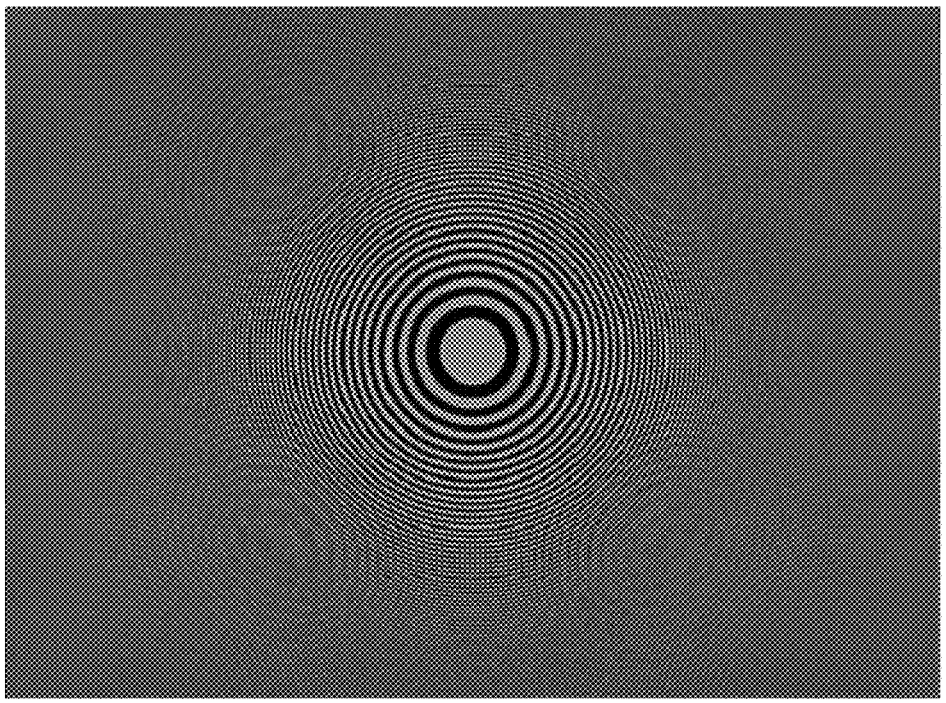
FIG. 9 is an exemplary parallax image after the correction process is performed in the first embodiment.
Figure 10:
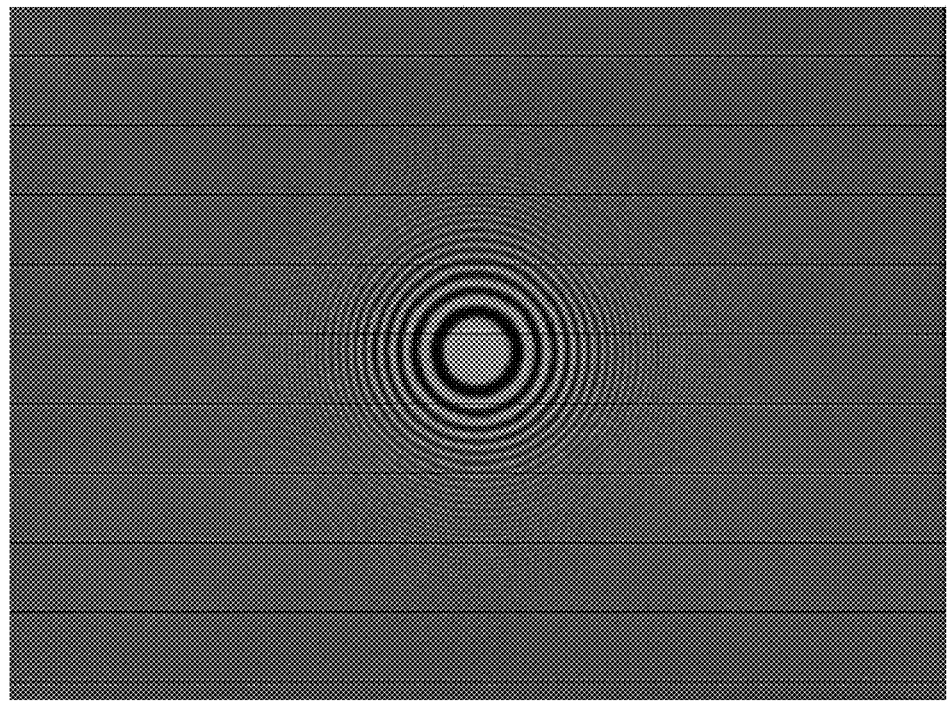
FIG. 10 is another exemplary parallax image before the correction process is performed in the first embodiment.
Figure 11:
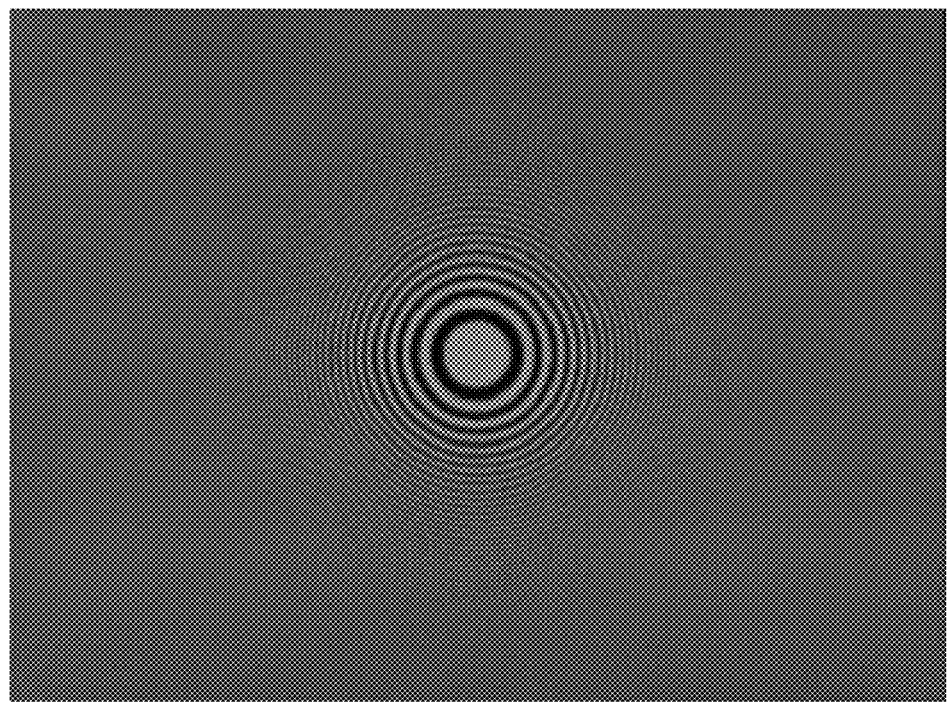
FIG. 11 is another exemplary parallax image after the correction process is performed in the first embodiment.

FIG. 8 illustrates an example of the first (demosaiced) parallax image in an in-focus state before the correction process according to this embodiment is performed. FIG. 9 illustrates an example of the first (demosaiced) parallax image in the in-focus state after the correction process according to this embodiment is performed. Similarly, FIG. 10 illustrates an example of the first (demosaiced) parallax image in a defocus state before the correction process is performed. FIG. 11 illustrates an example of the first (demosaiced) parallax image in the defocus state after the correction process is performed. It is understood that the defect of the parallax image is corrected by the correction process according to this embodiment in each of the in-focus state and the defocus state.

Figure 14:
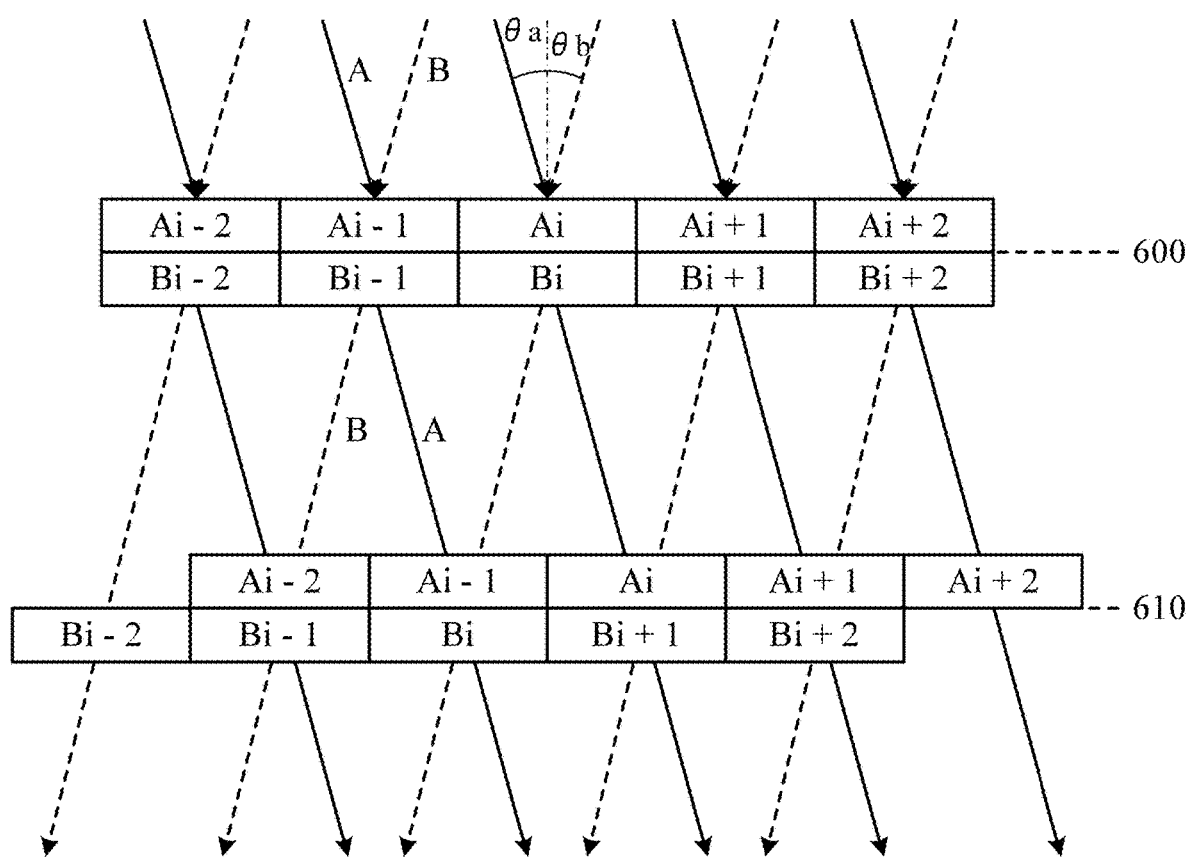
FIG. 14 is a schematic explanatory diagram of a refocus process in each embodiment.

Referring now to FIG. 14, a refocus process according to this embodiment will be described. The refocus process is performed by the image processing circuit 125 (image processing unit 125b as a refocus unit) based on an instruction of the CPU 121. FIG. 14 is an explanatory diagram of the refocus process in one-dimensional direction (column direction or horizontal direction) by a first signal (light receiving signal of the first subpixel that forms the first parallax image) and a second signal (light receiving signal of the second subpixel that forms the second parallax image) acquired by the image pickup element 107 according to this embodiment. In FIG. 14, symbol i denotes an integer, and schematically symbols Ai and Bi denote the first signal and the second signal, respectively, of an i-th pixel disposed on the imaging plane 600 in the column direction in the image pickup element 107. The first signal Ai is a light receiving signal output based on the light beam entering the i-th pixel at a principal ray angle θa (corresponding to the partial pupil region 501 in FIG. 5). The second signal Bi is a light receiving signal output based on the light beam entering the i-th pixel at a principal ray angle θb (corresponding to the partial pupil region 502 in FIG. 5).

Each of the first signal Ai and the second signal Bi has incident angle information as well as light intensity distribution information. Therefore, the first signal Ai is moved parallel (translated) to a virtual imaging plane 610 at the angle θa and the second signal Bi is moved parallel (translated) to the virtual imaging plane 610 at the angle θb, and then these signals are added to generate the refocus signal on the virtual imaging plane 610. The parallel movement of the first signal Ai to the virtual imaging plane 610 at the angle θa corresponds to a shift by +0.5 pixel in the column direction, and the parallel movement of the second signal Bi to the virtual imaging plane 610 at the angle θb corresponds to a shift by −0.5 pixel in the column direction. Accordingly, when the first signal Ai and the second signal Bi relatively shifted by +1 pixel to add the first signal Ai to the corresponding second signal (Bi+1) and to combine the first signal Ai with the second signal (Bi+1), the refocus signal on the virtual imaging plane 610 can be generated. Similarly, when the first signal Ai and the second signal Bi are shifted by an integral multiple of the pixel pitch (i.e. integer shift is performed) and these signals are added to each other, the shift addition signal (refocus signal) on each virtual imaging plane can be generated according to the integer shift amount.

In this embodiment, the influence of the defect included in at least one of the parallax images (at least one of the first parallax image and the second parallax image) is removed or reduced by the correction process. Therefore, it is possible to perform the refocus process based on the corrected parallax image. Accordingly, the refocus process by using each of signals (first signal and second signal) that form the parallax images can be performed with a high accuracy.

Second Embodiment

Figure 12:
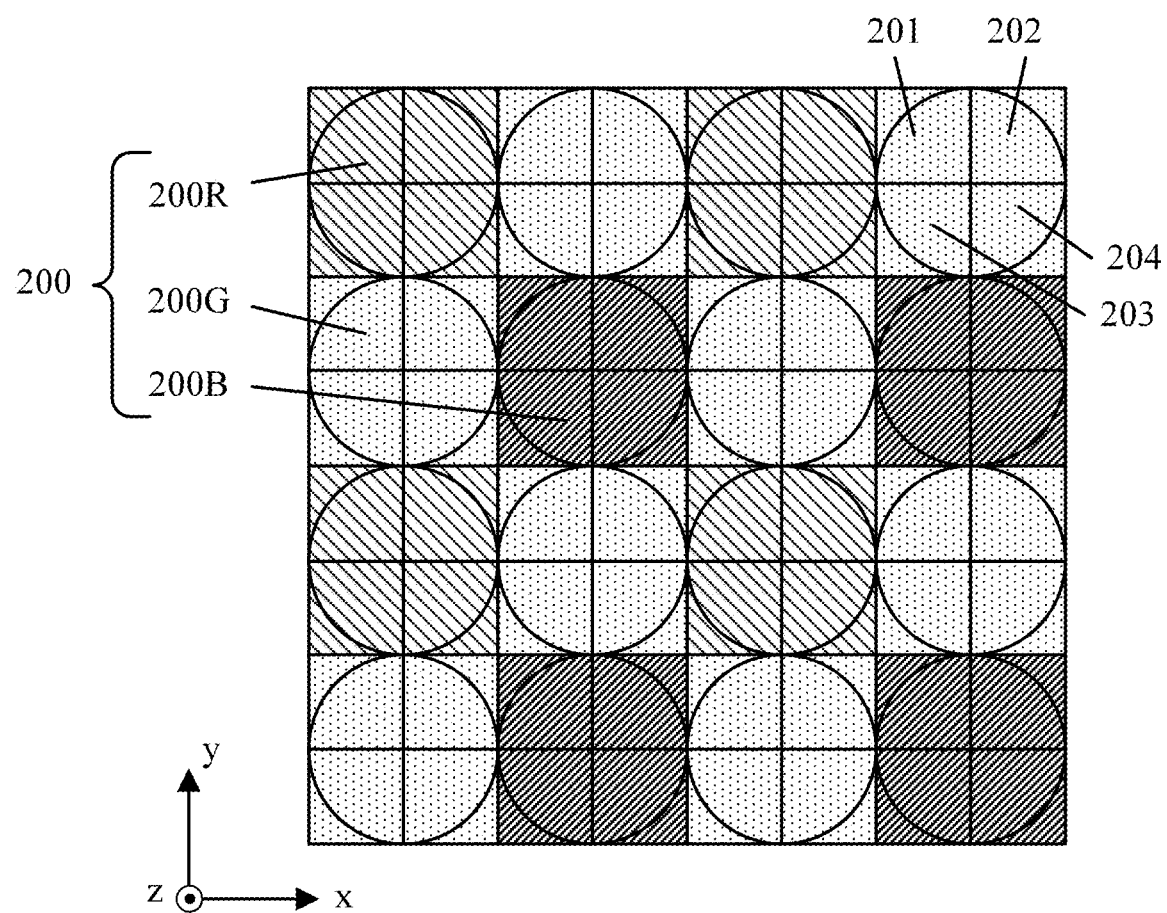
FIG. 12 is a diagram of illustrating a pixel array in a second embodiment.
Figure 13A:
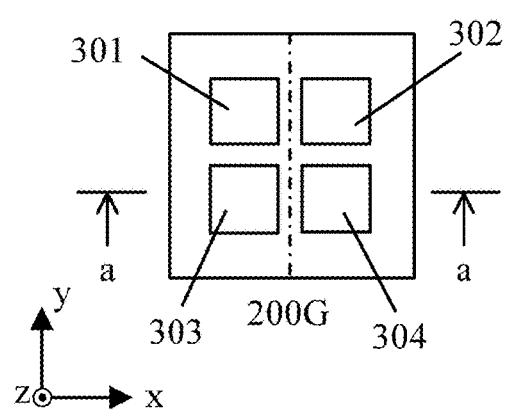
FIG. 13A is a diagram illustrating a pixel structure in the second embodiment.
Figure 13B:
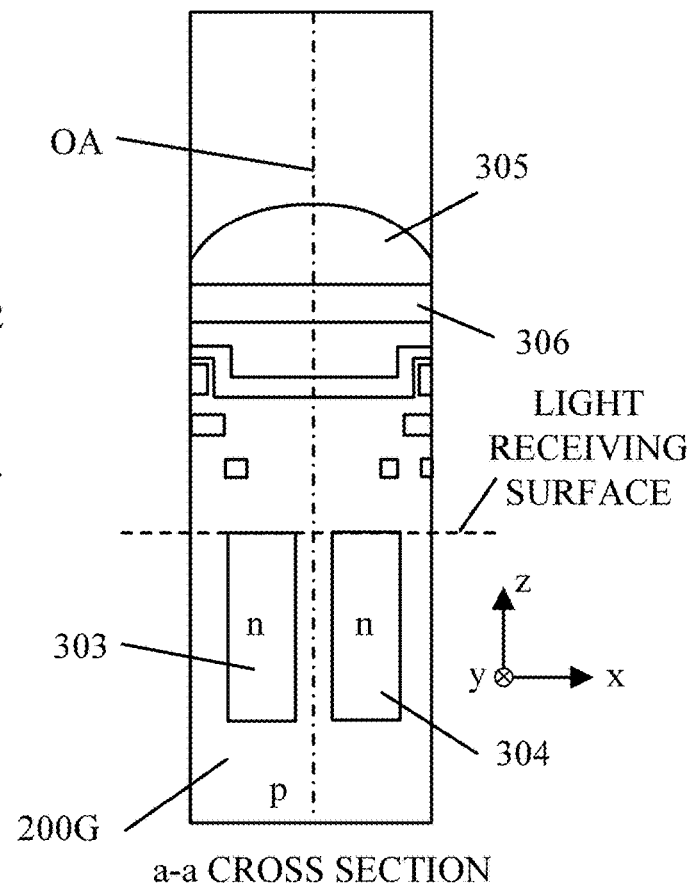
FIG. 13B is a diagram illustrating the pixel structure in the second embodiment.

Referring now to FIG. 12 and FIGS. 13A and 13B, an image pickup apparatus according to a second embodiment of the present invention will be described. This embodiment is different from the first embodiment in that a captured image is generated based on the first to fourth parallax images as a plurality of parallax images, instead of generating the captured image based on the first and second parallax images.

FIG. 12 illustrates the pixel array of the image pickup element 107 according to this embodiment. FIGS. 13A and 13B are diagrams illustrating the pixel structure of the image pickup element 107, and FIGS. 13A and 13B are a plan view of a pixel 200G of the image pickup element 107 (viewed from the +z direction) and a sectional view along a line a-a in FIG. 13A (viewed from the −z direction), respectively.

FIG. 12 illustrates the pixel array (array of imaging pixels) of the image pickup element 107 (two-dimensional CMOS sensor) in a range of 4 columns×4 rows. In this embodiment, each of the imaging pixels (pixels 200R, 200G, and 200B) includes four subpixels 201, 202, 203, and 204. Therefore, FIG. 12 illustrates the array of the subpixels in a range of 8 columns×8 rows.

As illustrated in FIG. 12, a pixel group 200 of 2 columns×2 rows includes the pixels 200R, 200G, and 200B in a Bayer array. In other words, in the pixel group 200, the pixel 200R having a spectral sensitivity for R (red) is disposed at the upper left, the pixels 200G having a spectral sensitivity for G (green) are disposed at the upper right and at the lower left, and the pixel 200B having a spectral sensitivity for B (blue) is disposed at the lower right. Each of the pixels 200R, 200G, and 200B (each imaging pixel) includes the subpixels 201, 202, 203, and 204 arrayed in 2 columns×2 row. The subpixel 201 is a pixel which receives a light beam passing through a first pupil region of the imaging optical system. The subpixel 202 is a pixel which receives a light beam passing through a second pupil region of the imaging optical system. The subpixel 203 is a pixel which receives a light beam passing through a third pupil region of the imaging optical system. The subpixel 204 is a pixel which receives a light beam passing through a fourth pupil region in the imaging optical system.

As illustrated in FIG. 12, the image pickup element 107 includes many imaging pixels of 4 columns×4 rows (subpixels of 8 columns×8 rows) arranged on a surface, and outputs an imaging signal (subpixel signal). In the image pickup element 107 of this embodiment, a period P of the pixels (imaging pixels) is 4 μm, and the number N of the pixels (imaging pixels) is horizontally 5,575 columns×vertically 3,725 rows=approximately 20.75 million pixels. In the image pickup element 107, a period $P_{SUB}$ of the subpixels in a column direction is 2 μm, and the number $N_{SUB}$ of the subpixels is horizontally 11,150 columns×vertically 7,450 rows=approximately 83.00 million pixels. Alternatively, the image pickup element 107 may have a period P of the pixels (imaging pixels) of 6 μm and the number N of the pixels (imaging pixels) of horizontally 6,000 columns×vertically 4,000 rows=approximately 24.00 million pixels. Alternatively, a period $P_{SUB}$ of the subpixels in a column direction may be 3 μm, and the number $N_{SUB}$ of the subpixels may be horizontally 12,000 columns×vertically 4,000 rows=approximately 48.00 million pixels.

As illustrated in FIG. 13B, the pixel 200G of this embodiment is provided with a micro lens 305 at a light receiving surface side of the pixel to condense incident light. Each of the micro lenses 305 is disposed at a position away from the light receiving surface by a predetermined distance in a z-axis direction (direction of an optical axis direction OA). In the pixel 200G, photoelectric converters 301, 302, 303, and 304 (photoelectric converters) are formed by dividing the pixel into $N_H$ (two divisions) in an x direction and into $N_V$ (two division) in a y direction. The photoelectric converters 301 to 304 correspond to the subpixels 201 to 204, respectively.

In this embodiment, the image pickup element 107 includes the plurality of subpixels that share a single micro lens and that receive a plurality of light beams passing through regions (first to fourth partial pupil regions) different from each other in a pupil of the imaging optical system (imaging lens). The image pickup element 107 includes, as the plurality of subpixels, first subpixels (a plurality of subpixels 201), second subpixels (a plurality of subpixels 202), third subpixels (a plurality of subpixels 203), and fourth subpixels (a plurality of subpixels 204).

In this embodiment, signals of the subpixels 201, 202, 203, and 204 are added (combined) and read out for each pixel of the image pickup element 107 so that a captured image with a resolution of the effective pixel number N can be generated. As described above, the captured image is generated by combining light receiving signals of the plurality of subpixels (subpixels 201 to 204 in this embodiment) for each pixel.

In this embodiment, the light receiving signals of the plurality of subpixels 201 are collected to generate a first parallax image. Similarly, the light receiving signals of the plurality of subpixels 202 are collected to generate a second parallax image, and the light receiving signals of the plurality of subpixels 203 are collected to generate a third parallax image. Furthermore, in this embodiment, the first parallax image, the second parallax image, and the third parallax image are subtracted from the captured image to generate a fourth parallax image. However, this embodiment is not limited to this example, and the light receiving signals of the plurality of subpixels 204 are collected to generate the fourth parallax image. As described above, the parallax image is generated based on the light receiving signals of the plurality of subpixels for each of the partial pupil regions different from each other.

In this embodiment, each of the captured image and the first to third parallax images (and the fourth parallax image) is an image in the Bayer array. If necessary, each of the captured image and the first to third parallax images (and the fourth parallax image) may be demosaiced. The correction process (defect correction) on the parallax image according to this embodiment is the same as that in the first embodiment, and accordingly a descriptions thereof is omitted.

Third Embodiment

Next follows a description of the third embodiment according to the present invention. This embodiment is different from the first embodiment in that the image processing unit 125b performs a light amount correction process (shading correction) of a parallax image based on a captured image. In addition to the light amount correction process according to this embodiment, similar to the first embodiment, the correction process of the parallax image may be performed based on the captured image so as to reduce a defect contained in a parallax image.

A pupil region 500 illustrated in FIG. 4 has an approximately optical conjugate relationship with a light receiving surface that includes photoelectric converters 301 and 302 divided into 2×1 (first photoelectric converter to $N_{LF}$-th photoelectric converter divided into Nx×Ny) via a micro lens. The pupil region 500 is a pupil region from which pixels 200G each including subpixels 201 and 202 (first subpixels to $N_{LF}$-th subpixel) can receive light.

Figure 15A:
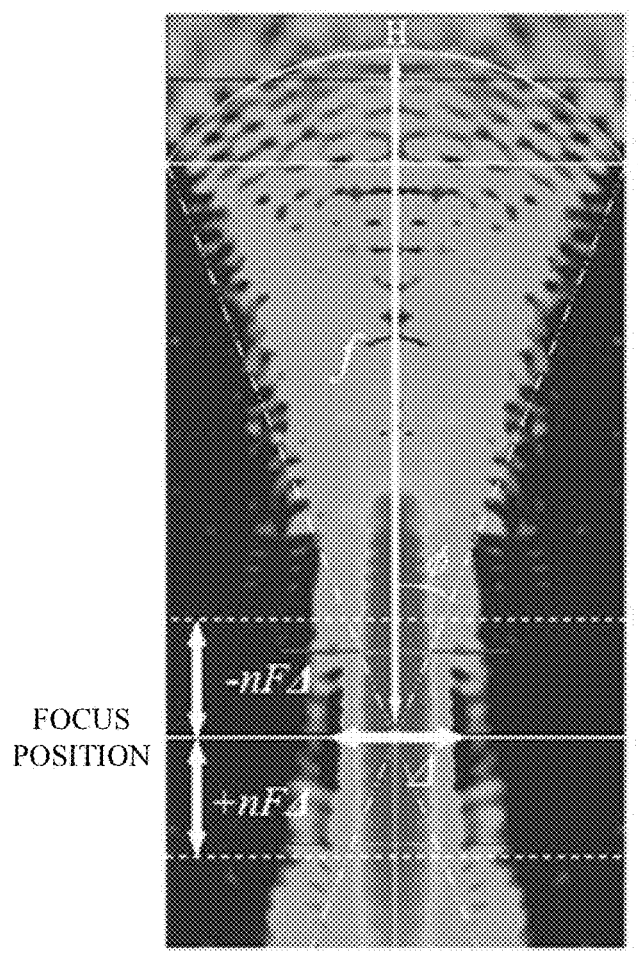
FIG. 15A is an explanatory view of a light amount distribution when light enters a micro lens formed on each pixel in a third embodiment.
Figure 15B:
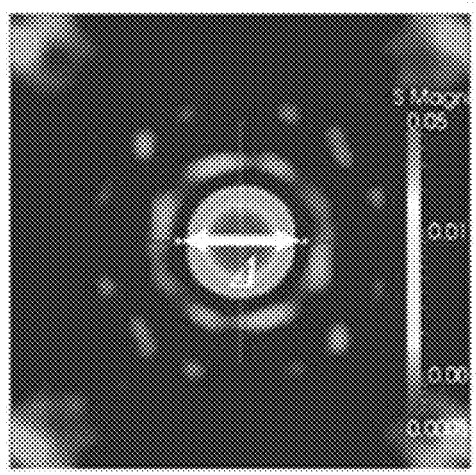
FIG. 15B is an explanatory view of the light amount distribution when the light enters the micro lens formed on each pixel in the third embodiment.

FIGS. 15A and 15B are explanatory views of the light intensity distribution where light enters the micro lens formed on each pixel. FIG. 15A illustrates a light intensity distribution of a section parallel to the optical axis of the micro lens. FIG. 15B illustrates a light intensity distribution of a section vertical to the optical axis of the micro lens. The incident light is condensed onto a focus position by the micro lens. However, due to the influence of the diffraction by the wave nature of the light, a diameter of a light condensed spot cannot be made smaller than a diffraction limit Δ and has a finite size. While the light receiving surface of the photoelectric converter has a length of about 1 to 2 μm, the condensed spot of the micro lens has a length of about 1 μm. Accordingly, due to the diffraction blurs, pupil part areas 501 and 502 illustrated in FIG. 4 which have a conjugate relationship with the light receiving surface of the photoelectric converter via the micro lens are not pupil-divided and have a light receiving rate distribution (pupil intensity distribution) depending on the light incident angle.

Figure 16:
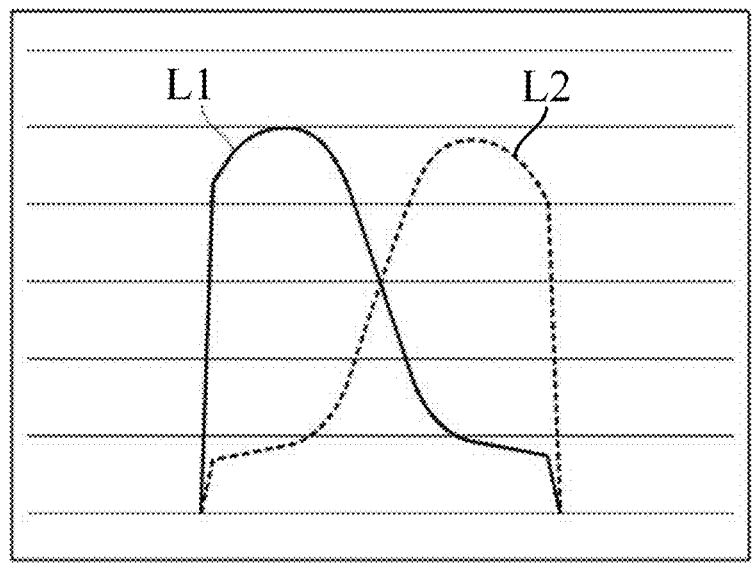
FIG. 16 illustrates a light receiving rate distribution that depends on a light incident angle in the third embodiment.

FIG. 16 is a view of a light receiving rate distribution (pupil intensity distribution) depending on the light incident angle. The abscissa axis denotes a pupil coordinate, and the ordinate axis denotes a light receiving rate. A graph line L1 represented by a solid-line in FIG. 16 represents a pupil intensity distribution along the x axis in the partial pupil region 501 (first partial area) in FIG. 4. The light receiving rate represented by the graph line L1 steeply rises from the left end, reaches a peak, then gradually reduces with a smooth variation rate, and reaches the right end. The graph line L2 represented by a broken line in FIG. 16 represents a pupil intensity distribution along the x axis of the partial pupil region 502 (second partial pupil region). Contrary to the graph line L1, the light receiving rate represented by the graph line L2 steeply rises from the right end, reaches its peak, gradually decreases with a smooth variation rate, and reaches the left end. It is understood as illustrated in FIG. 16 that the smooth pupil division is performed.

As illustrated in FIG. 5, the photoelectric converters 301 and 302 (first photoelectric converter to the $N_{LF}$-th photoelectric converter) correspond to the subpixels 201 and 202 (first subpixel to $N_{LF}$-th subpixel). In each pixel on the image pickup element, the subpixels 201 and 202 divided into 2×1 (first photoelectric converter to $N_{LF}$-th photoelectric converter divided into Nx×Ny) receive light that has passed different partial pupil regions on the partial pupil regions 501 and 502 (first subpixel to $N_{LF}$-th subpixel). The LF data (input data (input image) representing the spatial distribution and the angular distribution of the light intensity is obtained based on the signal received by each subpixel.

A captured image having a resolution of the pixel number N can be generated based on the LF data (input image) for each pixel by combining all the signals from the 2×1 divided subpixels 201 and 202 (Nx×Ny divided first photoelectric converter to $N_{LF}$-th photoelectric converter) with one another.

A signal form a specific subpixel is selected for each pixel from the 2×1 divided subpixels 201 and 202 (Nx×Ny divided first photoelectric converter to $N_{LF}$-th photoelectric converter) based on the LF data (input image). Thereby, a viewpoint image corresponding to a specific partial pupil region among the partial pupil regions 501 and 502 (first subpixel to $N_{LF}$-th subpixel) can be generated. For example, the first viewpoint image (first parallax image) can be generated with a resolution of the pixel number N corresponding to the partial pupil region 501 in the imaging optical system by selecting a signal from the subpixel 201. This is true of another subpixel.

As discussed, the image pickup element according to this embodiment has a plurality of arrayed pixels with a plurality of photoelectric converters configured to receive light beams that have passed different partial pupil regions in the imaging optical system, and can acquire the LF data (input data). This embodiment performs the image processing (correction process), such as a flaw correction and a shading correction, for the first viewpoint image and the second viewpoint image (first viewpoint image to $N_{LF}$-th viewpoint image) and generates an output image.

Figure 17:
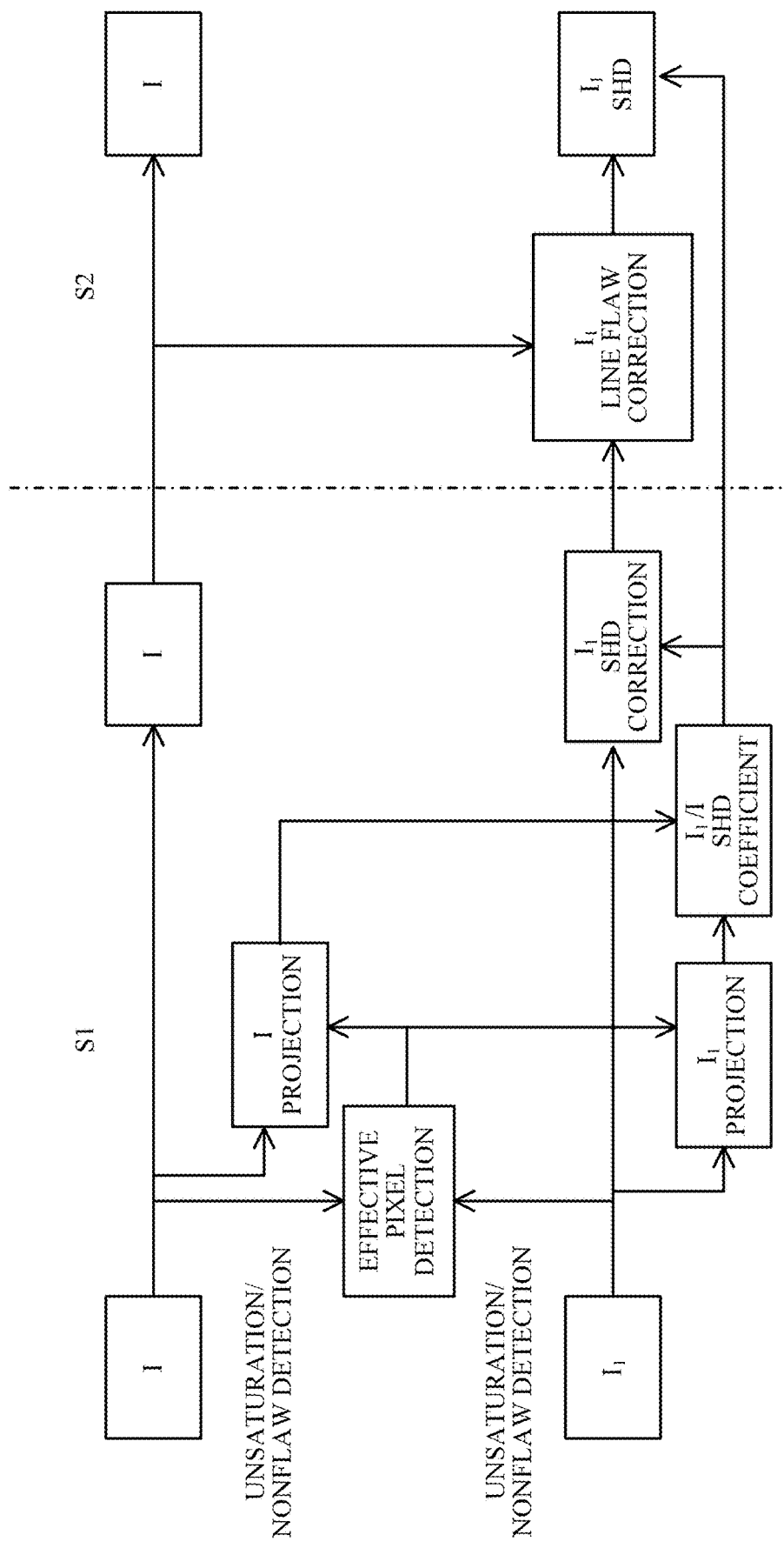
FIG. 17 is a schematic view of a flow of a correction process in the third embodiment.
Figure 18:
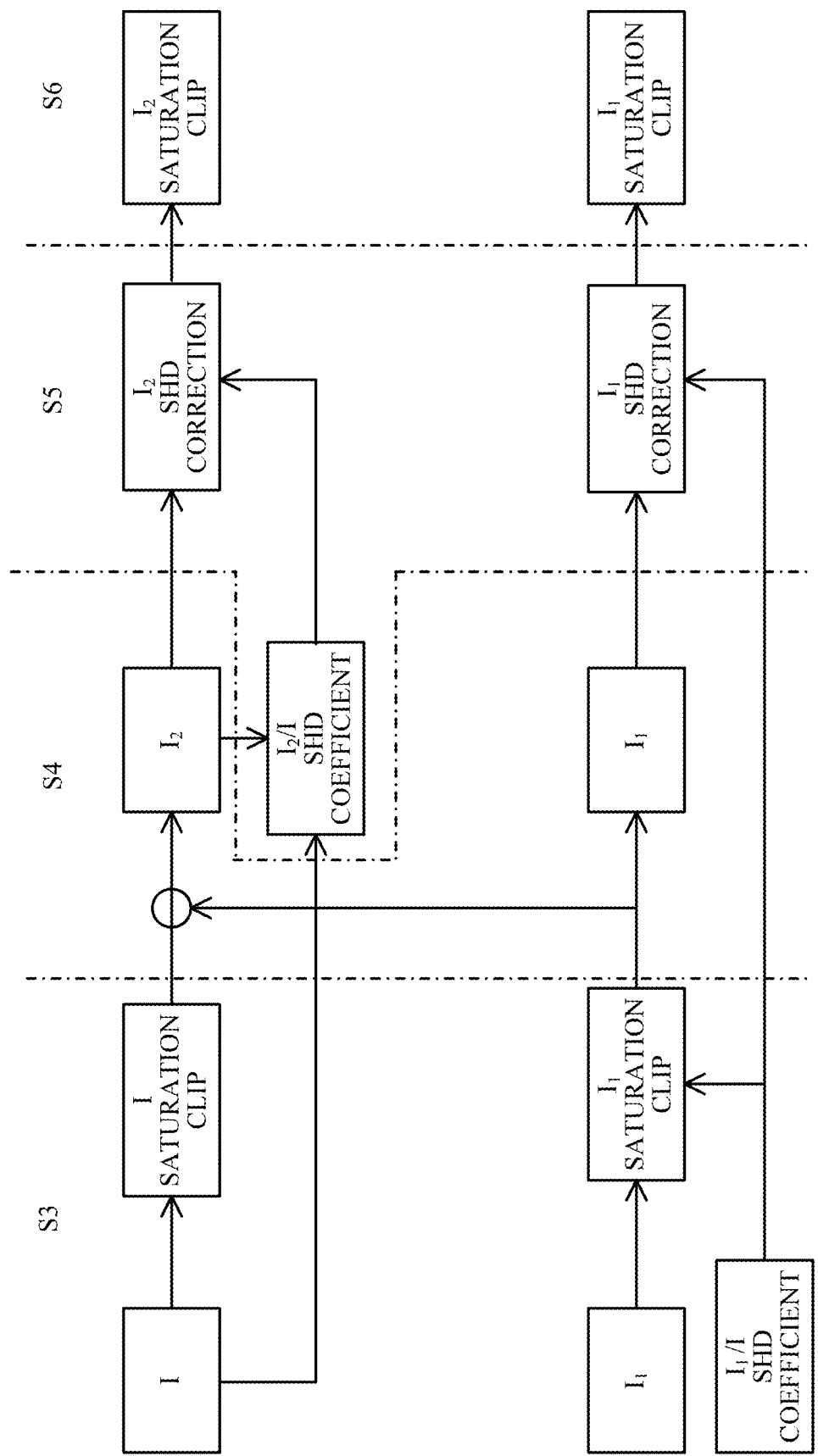
FIG. 18 is a schematic view of a flow of the correction process in the third embodiment.

Referring now to FIGS. 17 and 18, a description will be given of an image processing method for generating an output image by performing a correction process for the first viewpoint image and the second viewpoint image (first viewpoint image to $N_{LF}$-th viewpoint image) based on the LF data (input image) acquired by the image pickup element 107 and the captured image. FIGS. 17 and 18 are schematic views of a flow of the correction process according to this embodiment. The process in FIGS. 17 and 18 is mainly executed by the image processing circuit 125 (acquisition unit 125a and image processing unit 125b) based on a command of the CPU 121.

Initially, in a stage prior to the step S1 in FIG. 17 (or in the unillustrated step 0), the image processing circuit 125 (acquisition unit 125a) generates (acquires) a captured image and at least one viewpoint image based on the LF data (input data) acquired by the image pickup element 107. The captured image is an image generated in accordance with a pupil region into which different partial pupil regions in the imaging optical system are combined. The viewpoint image is an image generated for each different partial pupil region in the imaging optical system.

In the step S0, initially, the image processing circuit 125 inputs the LF data (input image) acquired by the image pickup element 107. Alternatively, the image processing circuit 125 may use the LF data (input image) previously captured by the image pickup element 107 and stored in the recording medium.

Next, in the step S0, the image processing circuit 125 generates a captured image depending on the pupil region into which different partial pupil regions (first partial pupil region and the second partial pupil region) are combined in the imaging optical system. The LF data (input image) will be referred to as LF. In addition, a subpixel signal that is the $i_s$-th ($1 \leq i_s \leq Nx$) in the column direction and the $j_s$-th ($1 \leq j_s \leq Ny$) in the row direction will be referred to as a k-th subpixel signal in each pixel signal of the LF, where $k=Nx(j_s-1)+i_s$ ($1 \leq k \leq N_{LF}$). The image processing circuit 125 generates, as expressed in the following expression (2), a combined image as a captured image $I(j, i)$ that is the $i_s$-th in the column direction and the $j_s$-th in the row direction.

$$I(j, i) = \sum_{j_S=1}^{N_y} \sum_{i_S=1}^{N_x} LF(N_y(j-1)+j_S, N_x(i-1)+i_s). \quad (2)$$

In order to maintain the good S/N of the captured image (j, i), this embodiment combines the subpixel signals of the expression (2) with each other in an electrostatic capacitor (FD) in the image pickup element before each subpixel signal is analog-to-digital-converted (A/D-converted). If necessary, before each subpixel signal is A/D-converted, this embodiment may combine the subpixel signals of the expression (2) with each other in converting the electric charges accumulated in the electrostatic capacitor (FD) in the image pickup element into the voltage signal. If necessary, after each subpixel signal is A/D-converted, this embodiment may combine the subpixel signals of the expression (2) with each other.

This embodiment bisects each pixel in the X direction such as Nx=2, Ny=1, and $N_{LF}$=2. All of the signals from the subpixels 201 and 202 bisected in the X direction (Nx×Ny divided first subpixel to $N_{LF}$ subpixel) are combined for each pixel based on the input image (LF data) corresponding to the illustrative pixel arrangement in FIG. 2. Thereby, a captured image as the RGB signal in the Bayer array can be generated with a resolution of the pixel number N (=horizontal pupil number $N_H$×the vertical pixel number $N_V$). Since the correction process to the viewpoint image according to this embodiment uses the captured image for the reference image of a correction reference, a shading (light amount) correction process and a dot flaw correction process, etc. are performed for the captured image I(j, i). If necessary, another process may be performed.

Next, in the step S0, the image processing circuit 125 generates the k-th viewpoint image $I_k(j, i)$ that is the i-th in the column direction and the j-th in the row direction corresponding to the k-th partial pupil region in the imaging optical system as expressed in the following expression (3).

$$I_k(j,i)=I_{N_x(j_S-1)+i_S}(j,i)=LF(N_y(j-1)+j_S, N_x(i-1)+i_S). \quad (3)$$

This embodiment bisects each pixel in the X direction such as Nx=2, Ny=1, $N_{LF}$=2, and k=1. This embodiment selects a signal of the subpixel 201 bisected in the x direction, for each pixel based on the LF data (input image) corresponding to the pixel arrangement illustrated in FIG. 2. Then, this embodiment generates a first viewpoint image $I_1(j, i)$ which is an RGB signal in the Bayer array with a resolution of the pixel number N (=horizontal pupil number $N_H$×the vertical pixel number $N_V$) based on the partial pupil regions 501 and 502 (first partial pupil region to $N_{LF}$-th partial pupil region). If necessary, k=2 may be selected, and the second viewpoint $I_2(j, i)$ corresponding to the partial pupil region 502 in the imaging optical system may be generated.

As described above, the image processing unit 125b generates a captured image corresponding to a pupil region into which different partial pupil regions are combined, based on the input image acquired by the image pickup element having a plurality of pixels with a plurality of photoelectric converters configured to receive light beams that have passed different partial pupil regions in the imaging optical system. In addition, the image processing unit 125b generates at least one viewpoint image for each different partial pupil region.

This embodiment generates the captured image I(j, i) as the RGB signal in the Bayer array and the first viewpoint image $I_1(j, i)$ as the RGB signal in the Bayer array based on the LF data (input image) acquired by the image pickup element 107, and stores them in the recording medium. In addition, this embodiment generates a second viewpoint image $I_2(j, i)$ based on the captured image I(j, i) and the first viewpoint image $I_1(j, i)$. This configuration can provide image processing similar to that for the captured image acquired by the conventional image pickup element in which the photoelectric converter on each pixel is not divided for the captured image I(j, i) in this embodiment. If necessary, in order to make equivalent the process to each viewpoint image, the first viewpoint image $I_1(j, i)$ and the second viewpoint image $I_2(j, i)$ may be generated and stored in the recording medium.

Next, in the step S1 in FIG. 17, the image processing unit 125b performs a shading correction process (light amount correction process) for each of RGB in the first viewpoint image $I_1$ (k-th viewpoint image $I_k$) based on the captured image I(j, i).

Figure 19A:
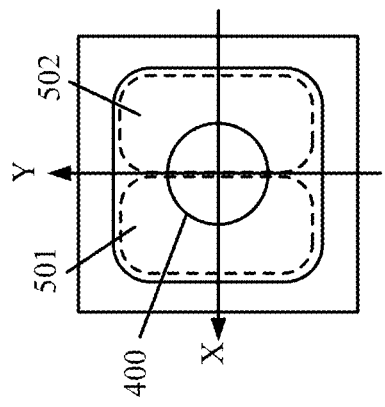
FIG. 19A is an explanatory view of shading in the third embodiment.
Figure 19B:
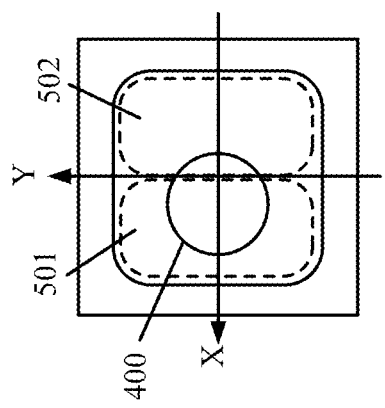
FIG. 19B is an explanatory view of shading in the third embodiment.
Figure 19C:
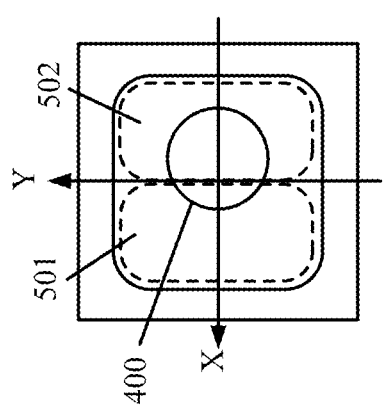
FIG. 19C is an explanatory view of shading in the third embodiment.

Referring now to FIGS. 19A to 19C, a description will be given of the shading caused by the pupil shift between the first viewpoint image and the second viewpoint image (first viewpoint image to $N_{LF}$-th viewpoint image). FIGS. 19A to 19C are explanatory views of shading, and illustrate a relationship among the partial pupil region 501 through which the photoelectric converter 301 receives light, the partial pupil region 502 through which the photoelectric converter 302 receives light, and an exit pupil 400 in the imaging optical system, at the peripheral image height in the image pickup element 107. Corresponding elements in FIG. 4 will be designated by the same reference numerals. The photoelectric converters 301 and 302 (first photoelectric converter to $N_{LF}$-th photoelectric converter) correspond to the subpixels 201 and 202 (first subpixel to the $N_{LF}$ subpixel).

FIG. 19A illustrates an exit pupil distance D1 in the imaging optical system equal to a set pupil distance Ds in the image pickup element 107. In this case, the exit pupil 400 in the imaging optical system is approximately uniformly divided by the partial pupil regions 501 and 502. On the contrary, as illustrated in FIG. 19B, where the exit pupil distance D1 in the imaging optical system is shorter than the set pupil distance Ds in the image pickup element 107, the pupil shift occurs between the exit pupil 400 and entrance pupil for the image pickup element 107 at the peripheral image height of the image pickup element 107. As a result, the exit pupil 400 is non-uniformly divided. Similarly, as illustrated in FIG. 19C, where the exit pupil distance C1 in the imaging optical system is longer than the set pupil distance Ds in the image pickup element 107, the pupil shift occurs between the exit pupil 400 and entrance pupil in the image pickup element 107 at the peripheral image height of the image pickup element 107. As a result, the exit pupil 400 is non-uniformly divided. Along with the non-uniform pupil division at the peripheral image height, the first viewpoint image and the second viewpoint image have non-uniform intensities and shading occurs for each of RGB (color) in which one of the first viewpoint image and the second viewpoint image has a high intensity and the other intensity is low.

In order to generate each viewpoint image with a good image quality, the image processing unit 125b according to this embodiment performs a shading correction (light amount correction) for each of RGB in the first viewpoint image $I_1$ (k-th viewpoint image $I_k$) by using the captured image I(j, i) as a base or reference image.

In the step S1 in FIG. 17, the image processing circuit 125 initially detects a valid pixel $V_1$(j, i) in which any one of the captured image I(j, i) and the first viewpoint image $I_1$(j, i) is unsaturated and non-defective (flawless). The effective pixel in which any one of the captured image I(j, i) and the first viewpoint image $I_1$(j, i) is unsaturated and non-defective satisfies $V_1$(j, i)=1. An ineffective pixel in which any one of the captured image I(j, i) and the first viewpoint image $I_1$(j, i) is saturated or defective satisfies $V_1$(j, i)=0. Similarly, in the shading (light quantity) correction for the k-th viewpoint image $I_k$, the effective pixel in which both of the captured image I(j, i) and the k-th viewpoint image $I_k$(j, i) is unsaturated and non-defective satisfies $V_k$(j, i)=1.

Assume integers $j_2$ ($1 \le j_2 \le N_V/2$) and $i_2$ ($1 \le i_2 \le N_H/2$). Assume that the captured image I in the Bayer array in FIG. 2 includes captured images RI, GrI, GbI, and BI for R, Gr, Gb, and B. The R captured image is expressed as $RI(2j_2-1, 2i_2-1)=I(2j_2-1, 2i_2-1)$ and the Gr captured image is expressed as $GrI(2j_2-1, 2i_2)=I(2j_2-1, 2i_2)$. The Gb captured image is expressed as $GbI(2j_2, 2i_2-1)=I(2j_2, 2i_2-1)$, and the B captured image is expressed as $BI(2j_2, 2i_2)=I(2j_2, 2i_2)$. Similarly, assume that the k-th captured image $I_k$ illustrated in FIG. 2 includes captured images $RI_k$, $GrI_k$, $GbI_k$, and $BI_k$ for R, Gr, Gb, and B. The R captured image is expressed as $RI_k(2j_2-1, 2i_2-1)=I_k(2j_2-1, 2i_2-1)$ and the Gr captured image is expressed as $GrI_k(2j_2-1, 2i_2)=I_k(2i_2-1, 2i_2)$. The Gb captured image is expressed as $GbI_k(2j_2, 2i_2-1)=I_k(2j_2, 2i_2-1)$ and the B captured image is expressed as $BI_k(2j_2, 2i_2)=I_k(2j_2, 2i_2)$.

In the step S1, next, the image processing unit 125b performs a projection process for the captured images $RI(2j_2-1, 2i_2-1)$, $GrI(2j_2-1, 2i_2)$, $GbI(2j_2, 2i_2-1)$, and $BI(2j_2, 2i_2)$. More specifically, for the captured images $RI(2j_2-1, 2i_2-1)$, $GrI(2j_2-1, 2i_2)$, $GbI(2j_2, 2i_2-1)$, and $BI(2j_2, 2i_2)$, the projection process is performed in the direction (y direction) orthogonal to the pupil dividing direction (x direction) with expressions (4A) to (4D). Thereby, the projection signals $RP(2i_2-1)$, $GrP(2i_2)$, $GbP(2i_2-1)$, and $BP(2i_2)$ of the captured images are generated. The saturated signal value or the defective signal value does not contain information used to correctly detect shading for each of RGB in the captured image. Hence, a product of the captured image and the effective pixel $V_k$ is calculated, the projection process is performed (numerators on the upper stages in expressions (4A) to (4D)) by excluding the saturated signal value and the defective signal value, and a normalization is performed with the effective pixel number used for the projection process (denominators on the upper stages in expressions (4A) to (4D)). Where the effective pixel number used for the projection process is 0, the projection signal of the captured signal is set to 0 by the lower stage in expression (4A) to the lower stage in expression (4D). The projection signal of the captured image is also set to 0 where the projection signal of the captured image becomes a negative signal due to the noise influences. Similarly, the projection process is performed for the k-th viewpoint images $RI_k(2j_2-1, 2i_2-1)$, $GrI_k(2j_2-1, 2i_2)$, $GbI_k(2j_2, 2i_2-1)$ and $BI_k(2j_2, 2i_2)$ in the direction (y direction) orthogonal to the pupil dividing direction (x direction) with expressions (4E) to (4H). This configuration generates projection signals $RP_k(2i_2-1)$, $GrP_k(2i_2)$, $GbP_k(2i_2-1)$, and $BP_k(2i_2)$ of the k-th viewpoint image.

$$RP(2i_2 - 1) = \begin{cases} \dfrac{\sum_{j_2=1}^{N_V/2} RI(2j_2-1, 2i_2-1) \times V_k(2j_2-1, 2i_2-1)}{\sum_{j_2=1}^{N_V/2} V_k(2j_2-1, 2i_2-1)}, & \sum_{j_2=1}^{N_V/2} V_k(2j_2-1, 2i_2-1) \ne 0, \\ 0, & \sum_{j_2=1}^{N_V/2} V_k(2j_2-1, 2i_2-1) = 0, \end{cases} \quad (4A)$$

$$G_r P(2i_2) = \begin{cases} \dfrac{\sum_{j_2=1}^{N_V/2} G_r I(2j_2-1, 2i_2) \times V_k(2j_2-1, 2i_2)}{\sum_{j_2=1}^{N_V/2} V_k(2j_2-1, 2i_2)}, & \sum_{j_2=1}^{N_V/2} V_k(2j_2-1, 2i_2) \neq 0, \\ 0, & \sum_{j_2=1}^{N_V/2} V_k(2j_2-1, 2i_2) = 0, \end{cases} \quad (4B)$$

$$G_b P(2i_2-1) = \begin{cases} \dfrac{\sum_{j_2=1}^{N_V/2} G_b I(2j_2, 2i_2-1) \times V_k(2j_2, 2i_2-1)}{\sum_{j_2=1}^{N_V/2} V_k(2j_2, 2i_2-1)}, & \sum_{j_2=1}^{N_V/2} V_k(2j_2, 2i_2-1) \neq 0, \\ 0, & \sum_{j_2=1}^{N_V/2} V_k(2j_2, 2i_2-1) = 0, \end{cases} \quad (4C)$$

$$BP(2i_2) = \begin{cases} \dfrac{\sum_{j_2=1}^{N_V/2} BI(2j_2, 2i_2) \times V_k(2j_2, 2i_2)}{\sum_{j_2=1}^{N_V/2} V_k(2j_2, 2i_2)}, & \sum_{j_2=1}^{N_V/2} V_k(2j_2, 2i_2) \neq 0, \\ 0, & \sum_{j_2=1}^{N_V/2} V_k(2j_2, 2i_2) = 0, \end{cases} \quad (4D)$$

$$RP_k(2i_2-1) = \begin{cases} \dfrac{\sum_{j_2=1}^{N_V/2} RI_k(2j_2-1, 2i_2-1) \times V_k(2j_2-1, 2i_2-1)}{\sum_{j_2=1}^{N_V/2} V_k(2j_2-1, 2i_2-1)}, & \sum_{j_2=1}^{N_V/2} V_k(2j_2-1, 2i_2-1) \neq 0, \\ 0, & \sum_{j_2=1}^{N_V/2} V_k(2j_2-1, 2i_2-1) = 0, \end{cases} \quad (4E)$$

$$G_r P_k(2i_2) = \begin{cases} \dfrac{\sum_{j_2=1}^{N_V/2} G_r I_k(2j_2-1, 2i_2) \times V_k(2j_2-1, 2i_2)}{\sum_{j_2=1}^{N_V/2} V_k(2j_2-1, 2i_2)}, & \sum_{j_2=1}^{N_V/2} V_k(2j_2-1, 2i_2) \neq 0, \\ 0, & \sum_{j_2=1}^{N_V/2} V_k(2j_2-1, 2i_2) = 0, \end{cases} \quad (4F)$$

$$G_b P_k(2i_2) = \begin{cases} \dfrac{\sum_{j_2=1}^{N_V/2} G_b I_k(2j_2, 2i_2-1) \times V_k(2j_2, 2i_2-1)}{\sum_{j_2=1}^{N_V/2} V_k(2j_2, 2i_2-1)}, & \sum_{j_2=1}^{N_V/2} V_k(2j_2, 2i_2-1) \neq 0, \\ 0, & \sum_{j_2=1}^{N_V/2} V_k(2j_2, 2i_2-1) = 0, \end{cases} \quad (4G)$$

$$BP_k(2i_2) = \begin{cases} \dfrac{\sum_{j_2=1}^{N_V/2} BI_k(2j_2, 2i_2) \times V_k(2j_2, 2i_2)}{\sum_{j_2=1}^{N_V/2} V_k(2j_2, 2i_2)}, & \sum_{j_2=1}^{N_V/2} V_k(2j_2, 2i_2) \neq 0, \\ 0, & \sum_{j_2=1}^{N_V/2} V_k(2j_2, 2i_2) = 0, \end{cases} \quad (4H)$$

A low-pass filter process follows the projection process of the expressions (4A) to (4H). The low-pass filter process is performed for the projection signals $RP(2i_2-1)$, $GrP(2i_2)$, $GbP(2i_2-1)$, and $BP(2i_2)$ of the captured image, and the projection signals $RP_k(2i_2-1)$, $GrP_k(2i_2)$, $GbP_k(2i_2-1)$, and $BP_k(2i_2)$ of the k-th viewpoint image. Thereby, the projection signal in the captured image is smoothed. Alternatively, the low-pass filter process may be omitted.

Figure 20A:
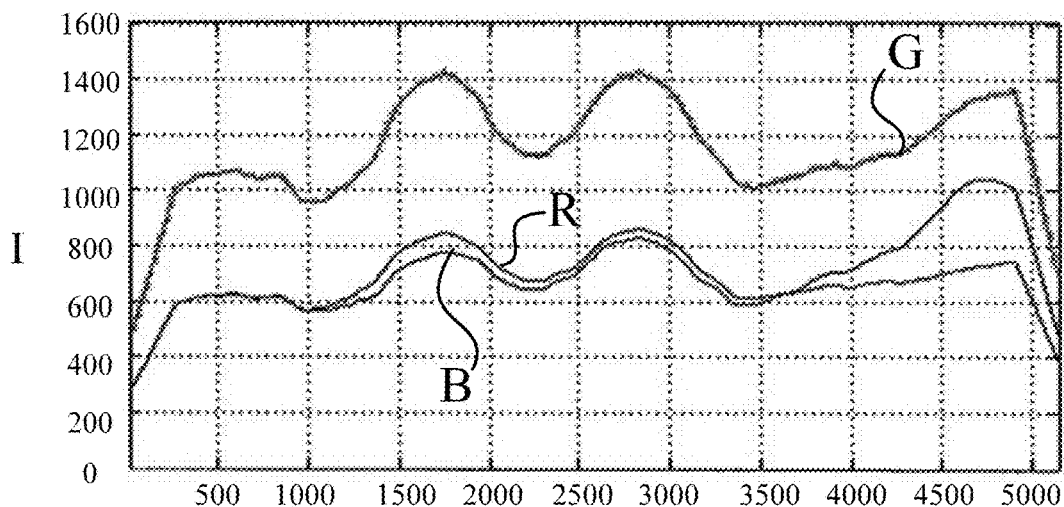
FIG. 20A is an explanatory view of a projection signal of a captured image in the third embodiment.
Figure 20B:
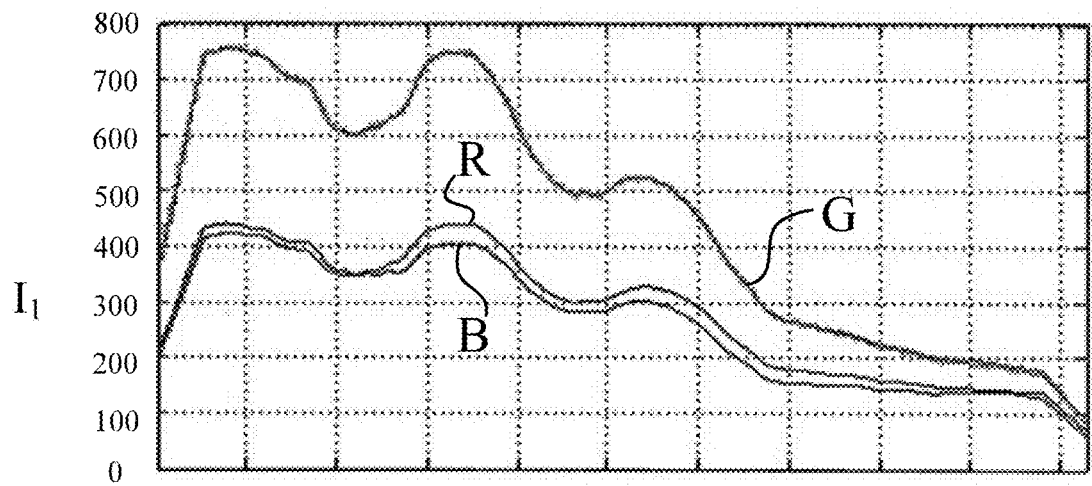
FIG. 20B is an explanatory view of a projection signal of a first viewpoint image in the third embodiment.
Figure 20C:
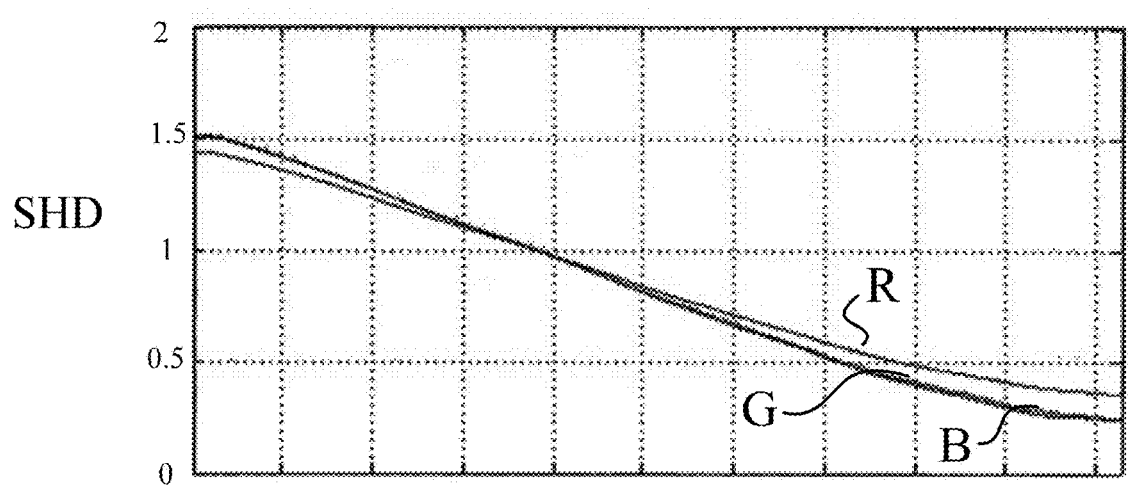
FIG. 20C is an explanatory view of a shading function in the third embodiment.

FIGS. 20A to 20C are explanatory views of the projection signals of the captured image, the projection signals of the first viewpoint image, and the shading function. FIG. 20A illustrates the illustrative projection signals RP(R), GrP(G), GbP(G), and BP(B) of the captured image. FIG. 20B illustrates the illustrative projection signals $RP_1(R)$, $GrP_1(G)$, $GbP_1(G)$, and $BP_1(B)$ of the first viewpoint image. Each projection signal has a plurality of undulations depending on the object. For a highly accurate shading correction of the first viewpoint image $I_1$ (k-th viewpoint image $I_k$), it is necessary to separate the shading component of the first viewpoint image $I_1$ (k-th viewpoint image $I_k$) caused by the pupil shift for each of RGB from the signal component for the RGB of the object.

In the step S1, the image processing unit 125b calculates shading signals $RS_k(2i_2-1)$, $GrS_k(2i_2)$, $GbS_k(2i_2-1)$, and $BS_k(2i_2)$ for each of RGB of the k-th viewpoint image $I_k$ relative to the captured image as a reference by expressions (5A) to (5D).

$$RS_k(2i_2-1) = \begin{cases} \dfrac{N_{LF} \times RP_k(2i_2-1)}{RP(2i_2-1)} & RP(2i_2-1) > RP_k(2i_2-1) > 0, \\ 0, & \text{otherwise,} \end{cases} \quad (5A)$$

$$G_r S_k(2i_2-1) = \begin{cases} \dfrac{N_{LF} \times G_r P_k(2i_2)}{G_r P(2i_2)} & G_r P(2i_2) > G_r P_k(2i_2) > 0, \\ 0, & \text{otherwise,} \end{cases} \quad (5B)$$

$$G_b S_k(2i_2-1) = \begin{cases} \dfrac{N_{LF} \times G_b P_k(2i_2-1)}{G_b P(2i_2-1)} & G_b P(2i_2-1) > G_b P_k(2i_2-1) > 0, \\ 0, & \text{otherwise,} \end{cases} \quad (5C)$$

$$BS_k(2i_2-1) = \begin{cases} \dfrac{N_{LF} \times BP_k(2i_2)}{BP(2i_2)} & BP(2i_2) > BP_k(2i_2) > 0, \\ 0, & \text{otherwise,} \end{cases} \quad (5D)$$

It is necessary that a light receiving amount of the pixel is larger than that of the subpixel, and the light receiving amount of the subpixel is larger than 0 in calculating the shading component. Hence, where a conditional expression $RP(2i_2-1) > RP_k(2i_2-1) > 0$ is satisfied, a ratio is acquired by the expression (5A) between the R projection signal $RP_k(2i_2-1)$ of the k-th viewpoint image and the R projection signal RP($2i_2-1$) of the captured image. Then, the result is multiplied by the pupil dividing number $N_{LF}$ for a normalization and the R shading signal $RS_k(2i_2-1)$ of the k-th viewpoint image $I_k$ is generated. Thereby, the R signal component of the object can be canceled out, and the R shading component of the k-th viewpoint image $I_k$ can be separated. Where the conditional expression RP($2i_2-1$)>$RP_k$($2i_2-1$)>0 is not satisfied, the R shading signal $RS_k(2i_2-1)$ of the k-th viewpoint image $I_k$ is set to 0.

Similarly, where a conditional expression GrP($2i_2$)>$GrP_k$($2i_2$)>0 is satisfied, a ratio is acquired by the expression (5B) between the Gr projection signal $GrP_k(2i_2)$ of the k-th viewpoint image and the Gr projection signal $GrP(2i_2)$ of the captured image. Then, the result is multiplied by the pupil dividing number $N_{LF}$ for a normalization and the Gr shading signal $GrS_k(2i_2)$ of the k-th viewpoint image $I_k$ is generated. Thereby, the Gr signal component of the object can be canceled out, and the Gr shading component of the k-th viewpoint image $I_k$ can be separated. Where the conditional expression GrP($2i_2$)>$GrP_k$($2i_2$)>0 is not satisfied, the Gr shading signal $GrS_k(2i_2)$ of the k-th viewpoint image $I_k$ is set to 0.

Similarly, where a conditional expression GbP($2i_2-1$)>$GbP_k$($2i_2-1$)>0 is satisfied, a ratio is acquired by the expression (5C) between the Gb projection signal $GbP_k(2i_2-1)$ of the k-th viewpoint image and the Gb projection signal $GbP(2i_2-1)$ of the captured image. Then, the result is multiplied by the pupil dividing number $N_{LF}$ for a normalization and the Gb shading signal $GbS_k(2i_2-1)$ of the k-th viewpoint image $I_k$ is generated. Thereby, the Gb signal component of the object can be canceled out, and the Gb shading component of the k-th viewpoint image $I_k$ can be separated. Where the conditional expression GbP($2i_2-1$)>$GbP_k$($2i_2-1$)>0 is not satisfied, the Gb shading signal $GbS_k(2i_2-1)$ of the k-th viewpoint image $I_k$ is set to 0.

Similarly, where a conditional expression BP($2i_2$)>$BP_k$($2i_2$)>0 is satisfied, a ratio is acquired by the expression (5D) between the B projection signal $BP_k(2i_2)$ of the k-th viewpoint image and the B projection signal $BP(2i_2)$ of the captured image. Then, the result is multiplied by the pupil dividing number $N_{LF}$ for a normalization and the B shading signal $BS_k(2i_2)$ of the k-th viewpoint image $I_k$ is generated. Thereby, the B signal component of the object can be canceled, and the B shading component of the k-th viewpoint image $I_k$ can be separated. Where the conditional expression BP($2i_2$)>$BP_k$($2i_2$)>0 is not satisfied, the B shading signal $BS_k(2i_2)$ of the k-th viewpoint image $I_k$ is set to 0.

For a high shading correction accuracy, where an effective shading-signal number that satisfies $RS_k(2i_2-1)>0$, $GrS_k(2i_2)>0$, $GbS_k(2i_2-1)>0$, and $BS_k(2i_2)>0$ is equal to or higher than a predetermined number, the shading correction may be provided.

Next, in the step S1, the image processing unit 125b performs a calculation process expressed by expressions (6A) to (6D). The shading functions $RSF_k(2i_2-1)$, $GrSF_k(2i_2)$, $GbSF_k(2i_2-1)$, and $BSF_k(2i_2)$ of the k-th viewpoint image $I_k$ for each of RGB are set to the smooth $N_{SF}$-th polynomial function to a positional variable in the pupil dividing direction (x direction). The effective shading signal that is generated by the expressions (5A) to (5D) and satisfies $RS_k(2i_2-1)>0$, $GrS_k(2i_2)>0$, $GbS_k(2i_2-1)>0$, and $BS_k(2i_2)>0$ is set to a data point. Coefficients $RSC_k(\mu)$, $GrSC_k(\mu)$, $GbSC_k(\mu)$, and $BSC_k(\mu)$ in expressions (6A) to (6D) are calculated by these data points and parameter fitting with the least squares method.

$$RSF_k(2i_2-1) = \sum_{\mu=0}^{N_{SF}} RSC_k(\mu) \times (2i_2-1)^\mu, \quad (6A)$$

$$G_rSF_k(2i_2) = \sum_{\mu=0}^{N_{SF}} G_rSC_k(\mu) \times (2i_2)^\mu, \quad (6B)$$

$$G_bSF_k(2i_2-1) = \sum_{\mu=0}^{N_{SF}} G_bSC_k(\mu) \times (2i_2-1)^\mu, \quad (6C)$$

$$BSF_k(2i_2) = \sum_{\mu=0}^{N_{SF}} BSC_k(\mu) \times (2i_2)^\mu. \quad (6D)$$

As described above, the shading functions $RSF_k(2i_2-1)$, $GrSF_k(2i_2)$, $GbSF_k(2i_2-1)$, and $BSF_k(2i_2)$ of the relative k-th viewpoint image $I_k$ for each of RGB on the basis of the captured image are generated.

FIG. 20C illustrates illustrative shading functions $RSF_1$(R), $GrSF_1$(G), $GbSF_1$(G), and $BSF_1$(B) for each of RGB of the first viewpoint image $I_1$ relative to the captured image as a reference. The projection signal of the first viewpoint image in FIG. 20B and the projection signal of the captured image in FIG. 20A have undulations depending on the object. On the other hand, the undulation (the signal value of the object for each of RGB) depending on the object can be canceled out by obtaining a ratio between the projection signal of the first viewpoint image and the projection signal of the captured image, and the shading function of the smooth first viewpoint image $I_1$ can be separated and generated for each of RGB. While this embodiment uses the polynomial function for the shading function, the present invention is not limited to this embodiment and may use a more general function depending on the shading shape, if necessary.

Next, in the step S1 in FIG. 17, the image processing unit 125b uses the shading function for each of RGB with expressions (7A) to (7D), and performs a shading (light quantity) correction process for the k-th viewpoint image $I_k(j, i)$. Thereby, the k-th viewpoint (first corrected) image $M_1I_k(j, i)$ after shading is corrected. The k-th viewpoint (first corrected) image $M_1I_k$ in the Bayer array is expressed for each of R, Gr, Gb, and B as follows. In other words, the k-th viewpoint (first corrected) image for R is set to $RM_1I_k(2j_2-1, 2i_2-1)=M_1I_k(2j_2-1, 2i_2-1)$, and the k-th viewpoint (first corrected) image for Gr is set to $GrM_1I_k(2j_2-1, 2i_2)=M_1I_k(2j_2-1, 2i_2)$. The k-th viewpoint (first corrected) image for Gb is set to $GbM_1I_k(2j_2, 2i_2-1)=M_1I_k(2j_2, 2i_2-1)$, and the k-th viewpoint (first corrected) image for B is set to $BM_1I_k(2j_2, 2i_2)=M_1I_k(2j_2, 2i_2)$. If necessary, the k-th viewpoint (first corrected) image $M_1I_k(j, i)$ after shading is corrected may be set to an output image.

$$RM_1I_k(2j_2-1, 2i_2-1) = \frac{RI_k(2j_2-1, 2i_2-1)}{RSF_k(2i_2-1)}, \quad (7A)$$

$$G_rM_1I_k(2j_2-1, 2i_2) = \frac{G_rI_k(2j_2-1, 2i_2)}{G_rSF_k(2i_2)}, \quad (7B)$$

$$G_bM_1I_k(2j_2, 2i_2-1) = \frac{G_bI_k(2j_2, 2i_2-1)}{G_bSF_k(2i_2-1)}, \quad (7C)$$

$$BM_1I_k(2j_2, 2i_2) = \frac{BI_k(2j_2, 2i_2)}{BSF_k(2i_2-1)}, \quad (7D)$$

Figure 21:
FIG. 21 illustrates an illustrative (demosaiced) captured image in the third embodiment.
Figure 22:
FIG. 22 is an illustrative first (demosaiced) viewpoint image before shading is corrected in the third embodiment.
Figure 23:
FIG. 23 is an illustrative first viewpoint (first corrected) image (that has been demosaiced) after shading is corrected in the third embodiment.

Referring now to FIGS. 21 to 23, a description will be given of an effect of the shading correction process (light amount correction process) for each of RGB of the first viewpoint image $I_1(j, i)$ illustrated in the step S1 in FIG. 17. FIG. 21 illustrates an illustrative (demosaiced) captured image I according to this embodiment. The illustrative captured image has a good image quality. FIG. 22 illustrates an illustrative first (demosaiced) viewpoint image $I_1$ before shading is corrected in this embodiment. The shading occurs for each of RGB due to the pupil shift between the exit pupil in the imaging optical system and the entrance pupil of the image pickup element, and the luminance lowers and the RGB ratio is modulated on the right side of the first viewpoint image $I_1(j, i)$. FIG. 23 illustrates an illustrative first viewpoint (first corrected) image $M_1I_1$ (post-demosaicing) after shading is corrected in this embodiment. The luminance lowers and the RGB ratio is modulated due to the shading correction for each of RGB based on the captured image, and the first viewpoint (first corrected) image $M_1I_1(j, i)$ (post-demosaicing) with a good image quality is generated similar to the captured image.

This embodiment generates a captured image depending on the pupil region into which different partial pupil regions are combined, based on an input image acquired by an image pickup element including a plurality of pixels with a plurality of photoelectric converters configured to receive light beams that have passed different partial pupil regions in the imaging optical system. Then, this embodiment generates a plurality of viewpoint images for each of the different partial pupil regions, performs image processing configured to correct the viewpoint image based on the captured image, and generates an output image. This embodiment performs image processing configured to correct a light amount (shading) for each color or for each of RGB based on the captured image. This embodiment performs image processing configured to correct a light amount of a viewpoint image based on the projection signal of the captured image and the projection signal of the viewpoint image. The configuration of this embodiment can provide a viewpoint image with a good quality.

Next, in the step S2 in FIG. 17, the image processing unit 125b corrects a defect of the k-th viewpoint (first corrected) image $M_1I_k$ after shading is corrected, based on the captured image I. This embodiment illustrates an example of k=1, but the present invention is not limited to this embodiment.

In this embodiment, due to the short-circuiting of the transfer gate etc., caused by the circuit configuration and driving method of the image pickup element, only part of the k-th viewpoint image $I_k$ (first viewpoint image $I_1$) causes a defective signal or a dot or line defect although the captured image I is normal. If necessary, this embodiment may previously store the dot defect information and line defect information inspected in the mass-production step etc. in the image processing circuit 125 etc., and may perform the defect correcting process for the k-th viewpoint image $I_k$ (first viewpoint image $I_1$) based on the recorded dot and line information. In addition, this embodiment may inspect the k-th viewpoint image $I_k$ (first viewpoint image $I_1$) on the real-time basis and provide a dot defect determination or a line defect determination.

A description will now be given of the defect correction (step S2 in FIG. 17) according to this embodiment. This embodiment assumes that an odd row $2j_D-1$ or an even row $2j_D$ in the k-th viewpoint image $I_k$ is determined to have a line defect in the horizontal direction (x direction) and an odd row $2j_D-1$ or an even row $2j_D$ in the captured image I is not determined to have a line defect.

In the defect correction in the step S2 in this embodiment, the captured image I that is normal is set to a reference image and the defect of the k-th viewpoint (first corrected) image $M_1I_k$ is corrected based on the captured image I. This embodiment corrects a defect by comparing a signal value of the k-th viewpoint (first correct) image $M_1I_k$ at a position that is not determined to be defective and a signal value of the captured image I at a position that is not determined to be defective. In this comparison, it is necessary for a highly accurate defect correction to remove the influence of the shading component for each of RGB of the k-th viewpoint image $I_k$ caused by the pupil shift, and to accurately compare the signal component for each of RGB of the object between the k-th viewpoint image $I_k$ and the captured image I. Hence, in the step S1, this embodiment previously corrects the shading (light amount) for each of RGB of the k-th viewpoint image, generates the k-th viewpoint (first corrected) image $M_1I_k$, creates a shading state similar to that of the captured image I, and removes the influence of a shading component. Thereafter, in the step S2, this embodiment highly accurately corrects a defect in the k-th viewpoint (first corrected) image $M_1I_k$ in which the shading is corrected, based on the captured image I.

In the step S2 in FIG. 17, this embodiment performs a defect correction process for the signal that is determined to be defective, from part of the k-th viewpoint (first corrected) image $M_1I_k(j, i)$ after the shading is corrected, based on the normal signal of the captured image I and the normal signal of the k-th viewpoint (first corrected) image $M_1I_k$. Then, this embodiment generates the k-th viewpoint (second corrected) image $M_2I_k(j, i)$ after the defect is corrected. Herein, the k-th viewpoint (second corrected) image $M_2I_k$ in the Bayer array is expressed for each of R, Gr, Gb, and B as follows. In other words, the k-th viewpoint (second corrected) image for R is expressed as $RM_2I_k(2j_2-1, 2i_2-1)=M_2I_k(2j_2-1, 2i_2-1)$, and the k-th viewpoint (second corrected) image for Gr is expressed as $GrM_2I_k(2j_2-1, 2i_2)=M_2I_k(2j_2-1, 2i_2)$. The k-th viewpoint (second corrected) image for Gb is expressed as $GbM_2I_k(2j_2, 2i_2-1)=M_2I_k(2j_2, 2i_2-1)$, and the k-th viewpoint (second corrected) image for B is expressed as $BM_2I_k(2j_2, 2i_2)=M_2I_k(2j_2, 2i_2)$.

In the step S2, assume that a first position $(2j_D-1, 2i_D-1)$ of the k-th viewpoint (first corrected) image $M_1I_k$ for R is determined to be defective. At this time, the defect correcting process is performed by the following expression (8A) based on the captured image $RI(2j_D-1, 2i_D-1)$ at the first position, the k-th viewpoint (first corrected) image $RM_1I_k$ at a second position for R that is not determined to be defective, and the captured image RI at the second position. This configuration generates the k-th viewpoint (second corrected) image $RM_2I_k(2j_D-1, 2i_D-1)$ after the defect is corrected at the first position.

Assume that a first position $(2j_D-1, 2i_D)$ of the k-th viewpoint (first corrected) image $M_1I_k$ for Gr is determined to be defective. At this time, the defect correcting process is performed by the following expression (8B) based on the captured image $GrI(2j_D-1, 2i_D)$ at the first position, the k-th viewpoint (first corrected) image $GbM_1I_k$ at the second position for Gb that is not determined to be defective, and the captured image GbI at the second position. This configuration generates the k-th viewpoint (second corrected) image $GrM_2I_k(2j_D-1, 2i_D)$ after the defect is corrected at the first position.

Assume that a first position $(2j_D, 2i_D-1)$ of the k-th viewpoint (first corrected) image $M_1I_k$ for Gb is determined to be defective. At this time, the defect correcting process is performed by the following expression (8C) based on the captured image GbI($2j_D$, $2i_D-1$) at the first position, the k-th viewpoint (first corrected) image $GrM_1I_k$ at a second position for Gr that is not determined to be defective, and the captured image GrI at the second position. This configuration generates the k-th viewpoint (second corrected) image $GbM_2I_k(2j_D, 2i_D-1)$ after the defect is corrected at the first position.

Assume that a first position ($2j_D$, $2i_D$) of the k-th viewpoint (first corrected) image $M_1I_k$ for B is determined to be defective. At this time, the defect correcting process is performed by the following expression (8D) based on the captured image BI($2j_D$, $2i_D$) at the first position, the k-th viewpoint (first corrected) image $BM_1I_k$ at a second position for B that is not determined to be defective, and the captured image BI at the second position. This configuration generates the k-th viewpoint (second corrected) image $BM_2I_k(2j_D, 2i_D)$ after the defect is corrected at the first position.

$$RM_2I_k(2j_D-1, 2i_D-1) = \tag{8A}$$
$$RI(2j_D-1, 2i_D-1) \times \frac{\sum_{\tau=\pm 2}\sum_{\sigma=0,\pm 2} RM_1I_k(2j_D-1+\tau, 2i_D-1+\sigma)}{\sum_{\tau=\pm 2}\sum_{\sigma=0,\pm 2} RI(2j_D-1+\tau, 2i_D-1+\sigma)},$$

$$G_rM_2I_k(2j_D-1, 2i_D) = \tag{8B}$$
$$G_rI(2j_D-1, 2i_D) \times \frac{\sum_{\tau=\pm 1}\sum_{\sigma=0,\pm 1} G_bM_1I_k(2j_D-1+\tau, 2i_D+\sigma)}{\sum_{\tau=\pm 1}\sum_{\sigma=0,\pm 1} G_bI(2j_D-1+\tau, 2i_D+\sigma)},$$

$$G_bM_2I_k(2j_D, 2i_D-1) = \tag{8C}$$
$$G_bI(2j_D, 2i_D-1) \times \frac{\sum_{\tau=\pm 1}\sum_{\sigma=0,\pm 1} G_rM_1I_k(2j_D+\tau, 2i_D-1+\sigma)}{\sum_{\tau=\pm 1}\sum_{\sigma=0,\pm 1} G_rI(2j_D+\tau, 2i_D-1+\sigma)},$$

$$BM_2I_k(2j_D, 2i_D) = \tag{8D}$$
$$BI(2j_D, 2i_D) \times \frac{\sum_{\tau=\pm 2}\sum_{\sigma=0,\pm 2} BM_1I_k(2j_D+\tau, 2i_D+\sigma)}{\sum_{\tau=\pm 2}\sum_{\sigma=0,\pm 2} BI(2j_D-1+\tau, 2i_D+\sigma)}.$$

At most positions (j, i) that are not determined to be defective, the k-th viewpoint (second corrected) image $M_2I_k$(j, i) has the same signal value as that of the k-th viewpoint (first corrected) image $M_1I_k$(j, i) and $M_2I_k(j, i)=M_1I_k(j, i)$ is established. If necessary, the k-th viewpoint (second corrected) image $M_2I_k$(j, i) after the defect is corrected may be output as an output image.

Figure 24:
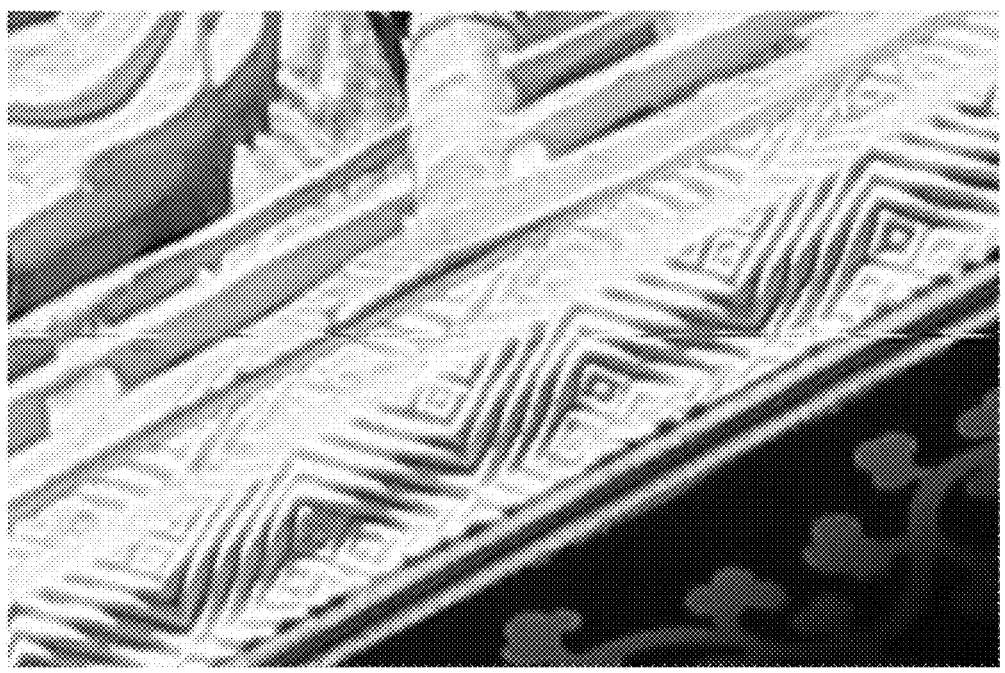
FIG. 24 is an illustrative first viewpoint (first corrected) image (that has been demosaiced) after shading is corrected before a defect is corrected in the third embodiment.
Figure 25:
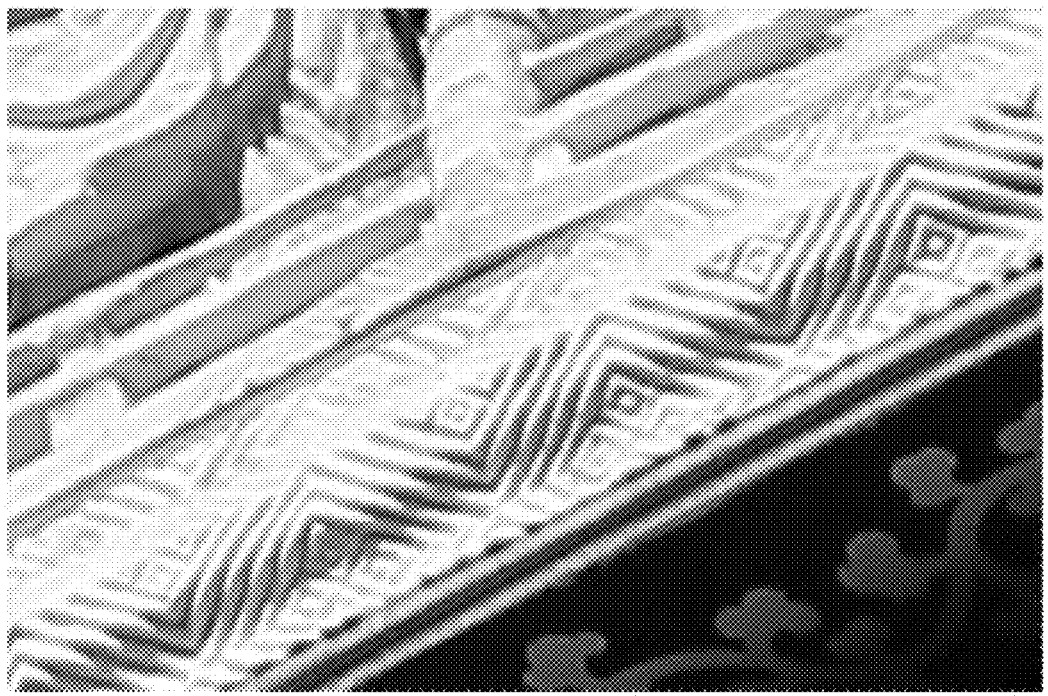
FIG. 25 is an illustrative first viewpoint (second corrected) image (that has been demosaiced) after shading is corrected and a defect is corrected in the third embodiment.

Referring now to FIGS. 24 and 25, a description will be given of an effect of the defect correction based on the normally captured image I of the first viewpoint (first corrected) image $M_1I_1$ illustrated in the step S2 in FIG. 17 in this embodiment. FIG. 24 illustrates an example of the first viewpoint (first corrected) image $M_1I_1$ (post-shading correction and post-demosaicing) before the defect is corrected in this embodiment. An illustrative line defect occurs in the horizontal direction (x direction) at the center of the first viewpoint (first corrected) image $M_1I_1$(j, i). FIG. 25 illustrates an example of the first viewpoint (second corrected) image $M_2I_1$ (post-shading correction and post-demosaicing) after the defect is corrected in this embodiment. Due to the defect correction based on the normally captured image I, the line defect in the horizontal (x direction) is corrected and the first viewpoint (second corrected) image $M_2I_1$(j, i) is generated with a good quality after the defect is corrected, similar to the captured image.

This embodiment generates a captured image depending on a pupil region into which different partial pupil regions are combined, based on an input image acquired by an image pickup element including a plurality of pixels with a plurality of photoelectric converters configured to receive light beams that have passed different partial pupil regions in the imaging optical system. Then, this embodiment generates a plurality of viewpoint images for each of the different partial pupil regions, performs image processing configured to correct a viewpoint image based on the captured image, and generates an output image. This embodiment performs image processing so as to correct and reduce the defect contained in the viewpoint image based on the captured image. This embodiment performs image processing configured to correct a signal value of a viewpoint image at a first position that is determined to be defective based on a signal value of a captured image at the first position. This embodiment performs signal processing configured to correct the signal value of the viewpoint image at the first position based on the signal value of the captured image at the first position that is determined to be defective, the signal value of the viewpoint image at the second position that is not determined to be defective, and the signal value of the captured image at the second position.

In this embodiment, the image processing unit 125b performs a correction process (image processing) so as to reduce the defect contained in the viewpoint image based on the captured image after the light amount correction process of the viewpoint image is performed based on the captured image. This configuration can generate the viewpoint image with a good quality.

Next, in the step S2 in FIG. 17, the image processing unit 125b performs a shading process for the k-th viewpoint (second corrected) image $M_2I_k$(j, i) after the defect is corrected, by using the following expressions (9A) to (9D). Thereby, the k-th viewpoint (third corrected) image $M_3I_k$(j, i) is generated.

$$RM_3I_k(2j_2-1, 2i_2-1) = RSF_k(2i_2-1) \times RM_2I_k(2j_2-1, 2i_2-1), \tag{9A}$$

$$G_rM_3I_k(2j_2-1, 2i_2) = G_rSF_k(2i_2) \times G_rM_2I_k(2j_2-1, 2i_2), \tag{9B}$$

$$G_bM_3I_k(2j_2, 2i_2-1) = G_bSF_k(2i_2-1) \times G_bM_2I_k(2j_2, 2i_2-1), \tag{9C}$$

$$BM_3I_k(2j_2, 2i_2) = BSF_k(2i_2) \times BM_2I_k(2j_2, 2i_2). \tag{9D}$$

Now, the k-th viewpoint (third corrected) image $M_3I_k$ in the Bayer array is acquired for each of R, Gr, Gb, and B. The k-th viewpoint (third corrected) image for R is expressed as $RM_3I_k(2j_2-1, 2i_2-1)=M_3I_k(2j_2-1, 2i_2-1)$, and the k-th viewpoint (third corrected) image for Gr is expressed as $GrM_3I_k(2j_2-1, 2i_2)=M_3I_k(2j_2-1, 2i_2)$. The k-th viewpoint (third corrected) image for Gb is expressed as $GbM_3I_k(2j_2, 2i_2-1)=M_3I_k(2j_2, 2i_2-1)$, and the k-th viewpoint (third corrected) image for B is expressed as $BM_3I_k(2j_2, 2i_2)=M_3I_k(2j_2, 2i_2)$.

In the step S3 in FIG. 18, a saturation signal process is performed for the captured image I(j, i) and the k-th viewpoint (third corrected) image $M_3I_k$(j, i). This embodiment discusses an example where k=1 and $N_{LF}=2$.

In the step S3, initially, the saturation signal process is performed with the following expression (10) for the captured image I(j, i) where a maximum value of the captured signal is set to Imax, and the corrected captured image MI(j, i) is generated.

$$MI(j, i) = \begin{cases} I_{max}, & I(j, i) > I_{max}, \\ I(j, i), & \text{otherwise.} \end{cases} \quad (10)$$

Next, in the step S3, the image processing unit 125*b* performs a saturation signal process corresponding to the shading state as in the following expression (11), for the k-th viewpoint (third corrected) image $M_3I_k(j, i)$ where the shading function for the Bayer array is set to $SF_k(j, i)$. Thereby, the k-th viewpoint (fourth corrected) image $M_4I_k(j, i)$ can be generated. Herein, the shading function $SF_k(j, i)$ for the Bayer array is calculated by the expression (6A) to (6D) based on shading functions $RSF_k(2i_2-1)$, $GrSF_k(2i_2)$, $GbSF_k(2i_2-1)$, and $BSF_k(2i_2)$ generated for each R, Gr, Gb, and B. In other words, assume that $SF_k(2j_2-1, 2i_2-1)=RSF_k(2i_2-1)$, $SF_k(2j_2-1, 2i_2)=GrSF_k(2i_2)$, $SF_k(2j_2, 2i_2-1)=GbSF_k(2i_2-1)$, $SF_k(2j_2, 2i_2)=BSF_k(2i_2)$.

$$M_4I_k(j, i) = \begin{cases} \frac{I_{max}}{N_{LF}} SF_k(j, i), & M_3I_k(j, i) > \frac{I_{max}}{N_{LF}} SF_k(j, i) \\ M_3I_k(j, i), & \text{otherwise} \end{cases} \quad (11)$$

In the step S4 in FIG. 18, the image processing unit 125*b* generates the second viewpoint image $I_2(j, i)$ based on expression (12), the corrected captured image MI(j, i), and the first viewpoint (fourth corrected) image $M_4I_1(j, i)$.

$$I_2(j,i)=MI(j,i)-M_4I_1(j,i). \quad (12)$$

In this embodiment, the maximum signal value in the saturation of the first viewpoint (third corrected) image $M_3I_1(j, i)$ may have the same maximum signal value as the maximum signal value Imax in the saturation of the captured image I(j, i) due to the driving method of the image pickup element 107 and the A/D conversion circuit configuration. In this case, when the second viewpoint image is generated by subtracting the first viewpoint (third corrected) image from the captured image as in the expression (12) without the saturated signal process and the second viewpoint image may have a saturated signal value, the saturated signal value may have an incorrect signal value of 0. Hence, in order to prevent this problem, the step S3 previously performs the saturation signal process corresponding to the shading state for the captured image I(j, i) and the k-th viewpoint (third corrected) image $M_3I_k(j, i)$, so as to generate the corrected captured image MI(j, i) after the saturation signal process is performed and the first viewpoint (fourth corrected) image $M_4I_1(j, i)$. Thereafter, the step S4 can generate the second viewpoint image $I_2$ corresponding to the correct saturated signal value using the expression (12) by generating the second viewpoint image $I_2(j, i)$.

In the step S5 in FIG. 18, the image processing unit 125*b* performs the shading correction (light amount correction) for the first viewpoint (fourth corrected) image $M_4I_1(j, i)$ and the second viewpoint image $I_2(j, i)$. More specifically, the shading correction (light amount correction) is performed for the first viewpoint (fourth corrected) image $M_4I_1(j, i)$ similar to the expressions (7A) and (7D) with the shading functions $RSF_1$, $GrSF_1$, $GbSF_1$, and $BSF_1$ that have already been generated by the expressions (6A) to (6D). Thereby, the first viewpoint (fifth corrected) image $M_5I_1(j, i)$ is generated. Next, in the step S5, the image processing unit 125*b* performs the shading correction (light amount correction) for the second viewpoint image $I_2(j, i)$ similar to the expressions (4A) and (7D) based on the corrected captured image MI(j, i). Thereby, the second viewpoint (fifth corrected) image $M_5I_2(j, i)$ is generated.

Finally, in the step S6 in FIG. 18, the image processing unit 125*b* performs the saturation signal process by the following expression (13) for the first viewpoint (fifth corrected) image $M_5I_1(j, i)$ and the second viewpoint (fifth corrected) image $M_5I_2(j, i)$. Thereby, the corrected first viewpoint image $MI_1(j, i)$ and the corrected second viewpoint image $MI_2(j, i)$ as the output images are generated.

$$MI_k(j, i) = \begin{cases} \frac{I_{max}}{N_{LF}}, & M_5I_k(j, i) > \frac{I_{max}}{N_{LF}}, \\ M_5I_k(j, i), & \text{otherwise.} \end{cases} \quad (13)$$

Figure 26:
FIG. 26 is an illustrative second viewpoint (first corrected) image (that has been demosaiced) before shading is corrected in the third embodiment.
Figure 27:
FIG. 27 is an illustrative second corrected viewpoint image (that has been demosaiced) after shading is corrected in the third embodiment.

Referring now to FIGS. 26 and 27, a description will be given of an effect of the shading correction process (light amount correction process) for each of RGB of the second viewpoint image $I_2(j, i)$ illustrated in the step S5 in FIG. 17. FIG. 26 illustrates an example of the second viewpoint image $I_2$ (post-demosaicing) before the shading is corrected in this embodiment. The pupil shift between the exit pupil in the imaging optical system and the entrance pupil of the image pickup element causes shading for each of RGB and thus the luminance reduction and the RGB ratio modulation on the left side of the second viewpoint image $I_2(j, i)$. FIG. 27 illustrates an example of the corrected second viewpoint image $MI_2$ (post-demosaicing) after the shading is corrected in this embodiment. The shading correction for each of RGB based on the captured image corrects the luminance reduction and the RGB ratio modulation, and generates the corrected second viewpoint image $MI_2(j, i)$ with a good quality after the shading is corrected, similar to the captured image.

An image processing apparatus according to this embodiment is an image processing apparatus having an image processing unit configured to perform the above image processing method. An image pickup apparatus according to this embodiment is an image pickup apparatus that includes an image pickup element including a plurality of arranged pixels with a plurality of subpixels configured to receive light beams that have passed the different partial pupil regions in the imaging optical system, and an image processing unit configured to perform the above image processing method. The configuration of this embodiment can generate the viewpoint image with a good quality.

Fourth Embodiment

Next follows a description will be given of a fourth embodiment according to the present invention. This embodiment detects an image shift amount distribution through a phase difference detection method based on the corrected first viewpoint image and the corrected second viewpoint image (corrected first viewpoint image to corrected $N_{LF}$-th viewpoint image) generated in the third embodiment and a correlation (coincidence of the signal) between the corrected first viewpoint image and the corrected second viewpoint image.

In generating the image shift amount distribution, initially, the color centers of gravity for RGB are accorded with one another for each position (j, i) based on the corrected k-th viewpoint image MIk (k=1 to $N_{LF}$) as the RGB signals in the Bayer array. A k-th viewpoint luminance signal Yk is generated by the following expression (14).

$$Y_k(j, i) = \begin{pmatrix} MI_k(j-1, i-1) & MI_k(j-1, i) & MI_k(j-1, i+1) \\ MI_k(j, i-1) & MI_k(j, i) & MI_k(j, i+1) \\ MI_k(j+1, i-1) & MI_k(j+1, i) & MI_k(j+1, i+1) \end{pmatrix} \quad (14)$$

$$\begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix}.$$

Next, in generating the image shift amount distribution, a one-dimensional bandpass filter process is performed for the first viewpoint luminance signal $Y_1$ generated by the expression (14) in the pupil dividing direction (column direction) based on the corrected first viewpoint image $MI_1$ as the RGB signal in the Bayer array, and generates a first focus detecting signal dYA. In addition, this embodiment performs a one-dimensional bandpass filter process for the second viewpoint luminance signal $Y_2$ generated by the expression (14) in the pupil dividing direction (column direction) based on the corrected second viewpoint image $MI_2$, and generates a second focus detecting signal dYB. The one-dimensional bandpass filter may use, for example, a primary differential filter [1, 5, 8, 8, 8, 8, 5, 1, −1, −5, −8, −8, −8, −8, −5, −1] etc. If necessary, a passage band may be adjusted for the one-dimensional bandpass filter.

Next, in generating the image shift amount distribution, this embodiment shifts the first focus detection signal dYA and the second focus detection signal dYB relative to each other in the pupil dividing direction (column direction), calculates a correlation amount representing the coincidence of the signal, and generates the image shift amount distribution $M_{DIS}(j, i)$ based on the correlation amount. This embodiment sets a first focus detection signal to $dYA(j+j_2, i+i_2)$ that is the $j_2$-th ($-n_2 \leq j_2 \leq n_2$) in the row direction and the $i_2$-th ($-m_2 \leq i_2 \leq m_2$) in the column direction as the pupil dividing direction around the position (j, i) as a center, and a second focus detection signal to $dYB(j+j_2, i+i_2)$. Assume that a shift amount is $s(-n_s \leq s \leq n_s)$. Then, a correlation amount $COR_{EVEN}(j, i, s)$ at each position (j, i) is calculated by the following expression (15A) and a correlation amount $COR_{ODD}(j, i, s)$ is calculated by the following expression (15B).

$$COR_{even}(j, i, s) = \sum_{j_2=-n_2}^{n_2} \sum_{i_2=-m_2}^{m_2} |dYA(j+j_2, i+i_2+s) - dYB(j+j_2, i+i_2-s)| \quad (15A)$$

$$COR_{odd}(j, i, s) = \sum_{j_2=-n_2}^{n_2} \sum_{i_2=-m_2}^{m_2} |dYA(j+j_2, i+i_2+s) - dYB(j+j_2, i+i_2-1-s)| \quad (15B)$$

The correlation amount $COR_{ODD}(j, i, s)$ is a correlation amount that is made by shifting a shift amount between the first focus detection signal dYa and the second focus detection signal dYB by half a phase or −1 relative to the correlation amount $COR_{EVEN}(j, i, s)$. This embodiment calculates and averages shift amounts of real number values that minimizes the correlation amount, based on the correlation amount $COR_{EVEN}(j, i, s)$ and the correlation amount $COR_{ODD}(j, i, s)$ through a subpixel calculation, and detects an image shift amount distribution $M_{DIS}(j, i)$.

In detecting an image shift amount by the phase difference method, this embodiment evaluates the correlation amounts in the expressions (15A) and (15B), and detects the image shift amount based on the correlation (coincidence of the signal) between the first focus detection signal and the second focus detection signal. This embodiment generates a first focus detection signal and a second focus detection signal based on the corrected first viewpoint image and the corrected second viewpoint image for which the shading (light amount) is corrected for each of RGB, and the captured image. Hence, this embodiment can improve the correlation (coincidence of the signal) between the first focus detection signal and the second focus detection signal, and highly accurately detect the image shift amount.

Where a lens is driven to an in-focus position in accordance with a defocus amount detected by the automatic focus detection, the image shift amount distribution $M_{DIS}(j, i)$ is multiplied by a conversion coefficient K from an image shift amount depending on lens information such as an F-number F in an image pickup lens (imaging optical system) and an exit pupil distance, to a defocus amount. Thereby, the defocus distribution $M_{Def}(j, i)$ can be detected. The calculation may be performed for each image height position in the focus detecting region.

This embodiment can generate a plurality of viewpoint images with good qualities. This embodiment can improve the detection accuracy of the image shift amount by using a plurality of viewpoint images with good qualities.

Fifth Embodiment

Next follows a description of a fifth embodiment according to the present invention. This embodiment discusses an illustrative quadrisection where Nx=2, Ny=2, and $N_{LF}$=4. In this embodiment, all signals from quadrisected subpixels 201 to 204 (Nx×Ny divided first subpixel to $N_{LF}$-th subpixel) are combined for each pixel based on the input image (LF data) corresponding to the pixel arrangement illustrated in FIG. 12 and the expression (2). The captured image is generated as the RGB signal in the Bayer array with a resolution of the pixel number N (=horizontal pixel number× $N_H$ vertical pixel number $N_v$).

This embodiment discusses an illustrative quadrisection where Nx=2, Ny=2, $N_{LF}$=4, and k=1 to 3. A signal of the subpixel 201 (first subpixel) is selected from the quadrisected subpixels 201 to 204 are combined for each pixel based on the LF data (input image) corresponding to the pixel arrangement illustrated in FIG. 12 and the expression (3). Then, this embodiment generates the first viewpoint image $I_1(j, i)$ as the RGB signal in the Bayer array with a resolution of the pixel number N corresponding to the partial pixel area 501 in the imaging optical system. This embodiment selects a signal of the subpixel 202 (second subpixel) from the quadrisected subpixels 201 to 204 for each pixel based on the LF data and the expression (3). This embodiment generates the second viewpoint image $I_2(j, i)$ as the RGB signal in the Bayer array with a resolution of the pixel number N corresponding to the partial pixel area 502 in the imaging optical system. This embodiment selects a signal of the subpixel 203 (third subpixel) from the quadrisected subpixels 201 to 204 for each pixel based on the LF data and the expression (3). This embodiment generates the third viewpoint image $I_3(j, i)$ as the RGB signal in the Bayer array with a resolution of the pixel number N corresponding to the partial pixel area 503 in the imaging optical system.

This embodiment generates a captured image depending on a pupil region into which different partial pupil regions are combined, based on an input image (LF data) acquired by an image pickup element including a plurality of arranged pixels with a plurality of photoelectric converters configured to receive light beams that have passed different partial pupil regions in the imaging optical system. Then, this embodiment generates a plurality of viewpoint images for each of the different partial pupil regions. In order to generate each viewpoint image with a good quality, this embodiment performs image processing, such as a flaw correction and a shading correction, similar to the third embodiment, for the first viewpoint image to the fourth viewpoint image (first viewpoint image to $N_{LF}$-th viewpoint image) based on the captured image, and generates an output image.

In the step S1 in FIG. 17, this embodiment corrects shading (or a light amount) for each of RGB in the first viewpoint image $I_1$ to the third viewpoint image $I_3$ (k-th viewpoint image $I_k$: k=1 to $N_{LF}-1$) by setting the captured image I(j, i) to a base or reference image. This embodiment discusses an illustrative quadrisection where Nx=2, Ny=2, $N_{LF}$=4, and k=1 to 3.

Initially, in the step S1, this embodiment corrects shading (light amount) in the x direction for the k-th viewpoint image $I_k$ (k=1 to $N_{LF}-1$) by the expressions (4A) to (7D). Next, in the expressions (4A) to (7D), the x direction is replaced with the y direction, and the shading (light amount) correction process is performed in the y direction, and the k-th viewpoint (first corrected) image $M_1I_k$ (k=1 to $N_{LF}-1$) is generated. In performing the two stages of the shading (light amount) correction in the x direction and the shading correction in the y direction, the pupil dividing number $N_{LF}$ is more than the necessary number by one so as to normalize the expressions (5A) to (5D). Hence, in the second shading correction in the y direction, the multiplication of the pupil dividing number $N_{LF}$ for the normalization is omitted in the expressions (5A) to (5D).

Due to the expressions (8A) to (10), the procedure of this embodiment is similar to that in the third embodiment until the k-th viewpoint (fourth corrected) image $M_4I_k$ (k=1 to $N_{LF}-1$) is generated. In the step S4 in FIG. 18, the $N_{LF}$-th viewpoint image $I_{N_{LF}}$(j, i) is generated by the following expression (16) based on the corrected captured image MI(j, i) and the k-th viewpoint (fourth corrected) image $M_4I_k$ (k=1 to $N_{LF}-1$). This embodiment discusses an illustrative quadrisection where Nx=2, Ny=2, and $N_{LF}$=4.

$$I_{N_{LF}}(j, i) = MI(j, i) - \sum_{k=1}^{N_{LF}-1} M_4 I_k(j, i). \quad (16)$$

The step S5 and subsequent steps in FIG. 18 are similar to those in the third embodiment.

This embodiment can generate a viewpoint image with a good quality. In the photoelectric converter in each pixel in the image pickup element, another embodiment may increase the number of divisions, such as nine divisions where Nx=3, Ny=3, and $N_{LF}$=9 and sixteen divisions where Nx=4, Ny=4, and $N_{LF}$=16.

As described above, the image processing apparatus (image processing circuit 125) in each embodiment includes an acquisition unit 125a and an image processing unit 125b (correction unit). The acquisition unit 125a acquires a parallax image generated based on a signal of one of a plurality of photoelectric converters which receive light beams passing through partial pupil regions in an imaging optical system which are different from each other, and acquires a captured image by combining signals from the plurality of photoelectric converters. The image processing unit 125b performs a correction process so as to reduce a defect (such as a dot flaw and a line flaw) contained in the parallax image based on the captured image.

Preferably, the image processing unit 125b corrects a pixel value (pixel signal) of the parallax image at a first position (position to be corrected) which is determined to be defective by using a pixel value (pixel signal) of the captured image at the first position. More preferably, the image processing unit 125b corrects the pixel value of the parallax image at the first position based on a pixel value I of the captured image at the first position, a pixel value of the parallax image at a second position which is not determined to be defective, and a pixel value of the captured image at the second position. The second position is a position of a pixel near (or around) the first position (position to be corrected). More preferably, the second position is a position adjacent to the first position in a predetermined direction (vertical direction, horizontal direction, or oblique direction on the pixel arrangement).

Preferably, when the pixel value of the parallax image or the captured image at the second position is lower than a predetermined luminance value (parameter A0 or I0), the image processing unit 125b replaces the pixel value with the predetermined luminance value. More preferably, the predetermined luminance value is set to change depending on the number of partial pupil regions. Preferably, the predetermined luminance value is set to change depending on the first position (position to be corrected). Preferably, the predetermined luminance value is set to change depending on imaging condition information. The imaging condition information includes at least one of an ISO speed, an F-number of the imaging optical system, and an exit pupil distance.

Preferably, the image processing apparatus includes a memory (memory 134) which stores defect information on the first position, or an inspector configured to inspect the defect information on the first position. The image processing unit 125b performs the correction process based on the defect information stored in the memory or the defect information obtained as an inspection result by the inspector.

Preferably, the parallax image is generated by collecting light receiving signals from a plurality of subpixels (a plurality of first subpixels, a plurality of second subpixels, a plurality of third subpixels, and a plurality of fourth subpixels) included in one photoelectric converter for each of the partial pupil regions in the imaging optical system different from each other. The captured image is generated by collecting light receiving signals from all subpixels (a plurality of first subpixels and a plurality of second subpixels, and in addition, a plurality of third subpixels and a plurality of fourth subpixels if necessary) included in the plurality of photoelectric converters.

Preferably, the parallax images include a first parallax image and a second parallax image which correspond to respective light beams passing through the partial pupil regions in the imaging optical system different from each other. Then, the acquisition unit 125a acquires the captured image and the first parallax image in the parallax images from an image pickup element 107 including the plurality of photoelectric converters. The image processing unit 125b performs the correction process for the first parallax image in the parallax images. Then, the image processing unit 125b generates the second parallax image by subtracting the corrected first parallax image from the captured image. Preferably, the image processing unit 125b (refocus unit) performs refocus process for the captured image based on the corrected parallax image.

Preferably, the image processing unit corrects a light amount or shading in the parallax image based on the captured image. More preferably, the image processing unit performs a light amount correction process of a parallax image for each color in the parallax image based on the captured image. More preferably, the image processing unit performs the light amount correction process for the parallax image based on the projection signal of the captured image and the projection signal of the parallax image. More preferably, after the image processing unit performs a light amount correction process for a parallax image, the image processing unit corrects a parallax image so as to reduce the defect contained in the parallax image after the light amount correction process is performed based on the captured image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an image processing apparatus, an image pickup apparatus, an image pickup apparatus, an image processing method, and a non-transitory computer-readable storage medium, each of which can generate a parallax image having an improved quality.

While the present invention has been described with reference to exemplary embodiments, the invention is not limited to the disclosed exemplary embodiments and various variations and modifications may be made without departing from the scope of the invention.

The invention claimed is:
1. An image processing apparatus comprising:
(A) a memory storing instructions;
(B) one or more processors that execute the instructions stored in the memory; and
(C) an image processing circuit that, based on the instructions executed by the one or more processors, is configured to function as:
(a) an acquisition unit configured to acquire (i) a parallax image generated based on a signal from one of a plurality of photoelectric converters corresponding to a same microlens from an image pickup element, wherein the image pickup element includes a plurality of pixels that includes the plurality of photoelectric converters, and wherein each of the plurality of pixels corresponds to a respective one of a plurality of microlenses, and (ii) a composite image generated by combining a plurality of signals from the plurality of photoelectric converters;
(b) an image processing unit configured (i) to calculate a correction value by using pixel values of the composite image corresponding to a defect, and (ii) to correct one or more pixel values of the parallax image that include the defect with the corresponding correction value; and
(c) a storage unit configured to store in a storage medium the parallax image corrected by the image processing unit.

2. The image processing apparatus according to claim 1, further comprising a determination unit configured to determine whether the parallax image contains the defect.

3. The image processing apparatus according to claim 2, wherein the image processing unit corrects the pixel value of the parallax image at a first position that contains the defect, based on a comparison of the pixel value of the parallax image with a pixel value of the composite image at the first position.

4. The image processing apparatus according to claim 3, wherein the image processing unit corrects the pixel value of the parallax image at the first position based on (1) the pixel value of the composite image at the first position, (2) a pixel value of the parallax image at a second position that does not contain a defect, and (3) a pixel value of the composite image at the second position.

5. The image processing apparatus according to claim 4, wherein the second position is a position adjacent to the first position in a predetermined direction.

6. The image processing apparatus according to claim 4, wherein when a luminance value of one of the pixel value of the parallax image at the second position and the pixel value of the composite image at the second position is less than a predetermined luminance value, the image processing unit replaces the pixel value of the parallax image with the predetermined luminance value.

7. The image processing apparatus according to claim 6, wherein the predetermined luminance value is set to change depending on a number of partial pupil regions.

8. The image processing apparatus according to claim 6, wherein the predetermined luminance value is set to change depending on the first position.

9. The image processing apparatus according to claim 6, wherein the predetermined luminance value is set to change depending on imaging condition information.

10. The image processing apparatus according to claim 9, wherein the imaging condition information includes at least one of (1) an International Organization of Standardization (ISO) speed, (2) an F-number of an imaging optical system which forms an optical image on the image pickup element, and (3) an exit pupil distance.

11. The image processing apparatus according to claim 3, wherein the memory is configured to store defect information on the first position, and wherein the image processing unit corrects the parallax image based on the stored defect information.

12. The image processing apparatus according to claim 11, further comprising an inspector configured to inspect defect information on the first position,
wherein the image processing unit corrects the parallax image based on the defect information.

13. The image processing apparatus according to claim 1, wherein the parallax image is generated by collecting light receiving signals from a plurality of subpixels included in the one photoelectric converter, of the plurality of photoelectric converters, for each of the partial pupil regions in an imaging optical system which forms an optical image on the image pickup element, the partial pupil regions being different from each other, and
wherein the composite image is generated by collecting light receiving signals from all subpixels included in the plurality of photoelectric converters.

14. The image processing apparatus according to claim 1, wherein, where a plurality of parallax images includes a first parallax image and a second parallax image, the first parallax image and the second parallax image corresponding to light beams passing through the partial pupil regions in an imaging optical system which forms an optical image on the image pickup element, the partial pupil regions being different from each other, the acquisition unit acquires the composite image and the first parallax image, among the plurality of parallax images, from an image pickup element including the plurality of photoelectric converters, and
wherein the image processing unit is further configured:
to correct the first parallax image, among the plurality of parallax images; and
to generate the second parallax image by subtracting the corrected first parallax image from the captured image.

15. The image processing apparatus according to claim 1, wherein the image processing unit performs a refocus process for the composite image based on the corrected parallax image.

16. The image processing apparatus according to claim 1, wherein the image processing unit performs a light amount correction process for the parallax image based on the composite image.

17. The image processing apparatus according to claim 16, wherein the image processing unit performs the light amount correction process for the parallax image based on the composite image for each color of the parallax image based on the composite image.

18. The image processing apparatus according to claim 16, wherein the image processing unit performs the light amount correction process for the parallax image based on a projection signal of the composite image and a projection signal of the parallax image.

19. The image processing apparatus according to claim 16, wherein the image processing unit corrects the parallax image after the light amount correction process is performed, based on the composite image, after the light amount correction process is performed for the parallax image.

20. An image pickup apparatus comprising:
(A) an image pickup element including a plurality of arrayed pixels that include a plurality of photoelectric converters that receive light beams passing through partial pupil regions in an imaging optical system which forms an optical image on the image pickup element, the partial pupil regions being different from each other;
(B) a memory storing instructions;
(C) one or more processors that execute the instructions stored in the memory; and
(D) an image processing circuit that, based on the instructions executed by the one or more processors, is configured to function as:
(a) an acquisition unit configured to acquire (i) a parallax image generated based on a signal from one of the plurality of photoelectric converters corresponding to a same microlens from the image pickup element, wherein the image pickup element includes a plurality of pixels that includes the plurality of photoelectric converters, and wherein each of the plurality of pixels corresponds to a respective one of a plurality of microlenses, and (ii) a composite image generated by combining signals from the plurality of photoelectric converters;
(b) an image processing unit configured (i) to calculate a correction value by using pixel values of the composite image corresponding to a defect, and (ii) to correct one or more pixel values of the parallax image that include the defect with the corresponding correction value; and
(c) a storage unit configured to store in a storage medium the parallax image corrected by the image processing unit.

21. The image pickup apparatus according to claim 20, wherein the image pickup element includes the plurality of photoelectric converters for a single microlens, and the microlens is two-dimensionally arrayed.

22. An image processing method comprising the steps of:
acquiring (i) a parallax image generated based on a signal from one of a plurality of photoelectric converters corresponding to a same microlens from an image pickup element, wherein the image pickup element includes a plurality of pixels that includes the plurality of photoelectric converters, and wherein each of the plurality of pixels corresponds to a respective one of a plurality of microlenses, and (ii) a composite image generated by combining a plurality of signals from the plurality of photoelectric converters;
calculating a correction value by using signals pixel values of the composite image corresponding to a defect;
correcting one or more pixel values of the parallax image that include the defect with the corresponding correction value; and
storing in a storage medium the parallax image corrected by the correcting.

23. A non-transitory computer-readable storage medium storing a program that causes a computer to execute an image processing method comprising the steps of:
acquiring (i) a parallax image generated based on a signal from one of a plurality of photoelectric converters corresponding to a same microlens from an image pickup element, wherein the image pickup element includes a plurality of pixels that includes the plurality of photoelectric converters, and wherein each of the plurality of pixels corresponds to a respective one of a plurality of microlenses, and (ii) a composite image generated by combining a plurality of signals from the plurality of photoelectric converters;
calculating a correction value by using the pixel values of the composite image corresponding to a defect;
correcting one or more pixel values of the parallax image with the corresponding correction value; and
storing in a storage medium the parallax image corrected by correcting.

24. The image processing apparatus according to claim 1, wherein the correction value Ac(i,j), for a pixel at a position (i,j) in the parallax image, is calculated using a pixel value A(i,j) of the parallax image and a pixel value I(i,j) of the composite image, in the following expression:

$$Ac(j, i) = \frac{\max\left(\sum_{k=i-1}^{i+1}[A(j-1, k) + A(j+1, k), A0]\right)}{\max\left(\sum_{k=i-1}^{i+1}[I(j-1, k) + I(j+1, k), I0]\right)} \times I(j, i)$$

where A0 and I0 are values used to stabilize a calculation value and to suppress an amplification of a noise.

\* \* \* \* \*